United States Patent
Jin et al.

(10) Patent No.: US 10,659,951 B2
(45) Date of Patent: *May 19, 2020

(54) LOCATION AREA MANAGEMENT METHOD AND DEVICE

(71) Applicant: Huawei Technologies Co., Ltd., Shenzhen (CN)

(72) Inventors: Weisheng Jin, Shanghai (CN); Bin Tan, Shanghai (CN); Ying Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,698

(22) Filed: Sep. 4, 2018

(65) Prior Publication Data

US 2018/0376321 A1    Dec. 27, 2018

Related U.S. Application Data

(63) Continuation of application No. 14/949,464, filed on Nov. 23, 2015, now Pat. No. 10,097,987, which is a
(Continued)

(51) Int. Cl.
*H04W 8/08* (2009.01)
*H04W 68/06* (2009.01)
(Continued)

(52) U.S. Cl.
CPC ............ *H04W 8/08* (2013.01); *H04W 8/085* (2013.01); *H04W 36/0061* (2013.01);
(Continued)

(58) Field of Classification Search
CPC ....... H04W 4/00–4/046; H04W 64/00; H04W 64/003; H04W 64/006; H04W 68/00–68/12
See application file for complete search history.

(56) References Cited

U.S. PATENT DOCUMENTS 6,556,820 B1    4/2003   Le et al.
9,198,124 B2   11/2015   Dahlen et al.
(Continued)

FOREIGN PATENT DOCUMENTS

CN    101090573 A    12/2007
CN    101141752 A    3/2008
(Continued)

OTHER PUBLICATIONS

LTE, "3rd Generation Partnership Project; Technical Specification Group Services and System Aspects; General Packet Radio Service (GPRS) Enhancements for Evolved Universal Terrestrial Radio Access Network (E-UTRAN) Access (Release 8)," 3GPP TS 23.401 v8.18.0, Mar. 2013, 238 pages.
(Continued)

*Primary Examiner* — San Htun

(74) *Attorney, Agent, or Firm* — Slater Matsil, LLP

(57) ABSTRACT

A location area management method and a device, the location area management method including receiving, by a single radio controller, a first request message, where the first request message is used by user equipment UE to request a location update, generating, by the single radio controller, a paging area list of the UE according to the first request message, where the paging area list includes a location area identity of a location area of at least one network standard, adding, by the single radio controller, the paging area list of the UE to a first response message, and sending the first response message to the UE.

20 Claims, 6 Drawing Sheets

Related U.S. Application Data continuation of application No. PCT/CN2013/076167, filed on May 23, 2013.

(51) Int. Cl.
  *H04W 60/04* (2009.01)
  *H04W 36/00* (2009.01)
  H04W 64/00 (2009.01)
  H04W 68/00 (2009.01)

(52) U.S. Cl.
  CPC ............ *H04W 60/04* (2013.01); *H04W 64/00* (2013.01); *H04W 68/00* (2013.01)

(56) References Cited

U.S. PATENT DOCUMENTS

| | | | |
|---|---|---|---|
| 9,313,729 | B2 | 4/2016 | Dahlen et al. |
| 2002/0183075 | A1 | 12/2002 | Fauconnier |
| 2003/0040314 | A1 | 2/2003 | Hogan et al. |
| 2004/0248571 | A1 | 12/2004 | Robinson et al. |
| 2007/0291685 | A1 | 12/2007 | Fiat |
| 2008/0095119 | A1* | 4/2008 | Bachmann ............ H04W 28/16 370/332 |
| 2008/0207170 | A1 | 8/2008 | Khetawat et al. |
| 2008/0220782 | A1* | 9/2008 | Wang ................. H04W 4/08 455/436 |
| 2010/0098023 | A1* | 4/2010 | Aghili ............... H04W 36/0022 370/331 |
| 2010/0279697 | A1* | 11/2010 | Yang .................. H04W 24/08 455/446 |
| 2010/0285801 | A1 | 11/2010 | Pudney |
| 2011/0116449 | A1 | 5/2011 | Hu et al. |
| 2011/0158161 | A1 | 6/2011 | Jain |
| 2011/0171975 | A1 | 7/2011 | Yin |
| 2011/0171987 | A1 | 7/2011 | Yin et al. |
| 2011/0190010 | A1 | 8/2011 | Cho |
| 2011/0195714 | A1 | 8/2011 | Sawinathan |
| 2012/0039313 | A1 | 2/2012 | Jain |
| 2012/0157093 | A1 | 6/2012 | Zhu et al. |
| 2012/0195255 | A1* | 8/2012 | Nylander ............ H04W 60/04 370/328 |
| 2012/0207013 | A1 | 8/2012 | Kamalaraj et al. |
| 2012/0282922 | A1* | 11/2012 | Fodor .................. H04W 8/22 455/426.1 |
| 2013/0051315 | A1* | 2/2013 | Arzelier ............... H04W 8/06 370/328 |
| 2013/0303176 | A1* | 11/2013 | Martin ................ H04W 76/18 455/450 |
| 2014/0155109 | A1* | 6/2014 | Vaidya ................ H04W 8/06 455/458 |

FOREIGN PATENT DOCUMENTS

| | | |
|---|---|---|
| CN | 101483853 A | 7/2009 |
| CN | 101489212 A | 7/2009 |
| CN | 101577955 A | 11/2009 |
| CN | 101686455 A | 3/2010 |
| CN | 101925174 A | 12/2010 |
| CN | 102026143 A | 4/2011 |
| CN | 102143480 A | 8/2011 |
| CN | 102754499 A | 10/2012 |
| EP | 2302844 A1 | 3/2011 |
| EP | 2323456 A1 | 5/2011 |
| EP | 2355600 A1 | 8/2011 |
| JP | 2013009028 A | 1/2013 |
| JP | 2013503506 A | 1/2013 |
| WO | 2012100199 A2 | 7/2012 |

OTHER PUBLICATIONS

"Correct Inconsistency with Stage 1 Regarding Support for Emergency Bearer Services in the Servicing Network," Source to WT: Research in Motion UK Ltd., Source to TSG: SA WG2, Work Item Code: TEI9, Category: A, Change Request, 23.401 CR 2543, Revision 1, Current Version: 12.0.0, SA WG2 Meeting #97, S2-131579, May 27-31, 2013, 42 pages.

"Tracking Area Update Procedure with ISR Functionality," Source: Nokia Siemens Networks, Nokia, Document for: Approval, Agenda Item: 8.2.8, Work Item/Release: SAES, 3GPP TSG SA WG2 Meeting #61, TD S2-075651, Nov. 12-16, 2007, 4 pages.

* cited by examiner

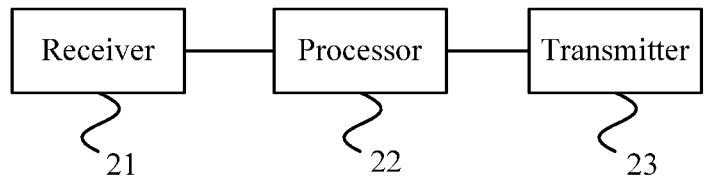

FIG. 5

A UE requests a single radio controller to perform a location update on the UE, so that the single radio controller receives a first request message, where the first request message is used to request the single radio controller to perform a location update on the UE, and after generating a paging area list of the UE according to the first request message, the single radio controller sends the paging area list of the UE to the UE, where the paging area list includes a location area identity of a location area of at least one network standard ~B100

The UE receives the paging area list of the UE sent by the single radio controller, so that the UE performs location update determining according to the paging area list of the UE ~B200

FIG. 6

A CC receives a second request message sent by a single radio controller, where the second request message carries a single radio controller identity used to indicate the single radio controller and a subscriber identity of a UE ~C100

The CC registers the UE according to the single radio controller identity and the subscriber identity of the UE ~C200

The CC sends a second response message to the single radio controller, so that, according to the second response message, the single radio controller establishes a location area hierarchical management context of the UE, and generates a paging area list of the UE ~C300

FIG. 7

LOCATION AREA MANAGEMENT METHOD AND DEVICE

CROSS-REFERENCE TO RELATED APPLICATIONS

This application is a continuation of U.S. patent application Ser. No. 14/949,464, filed on Nov. 23, 2015, which is a continuation of International Application No. PCT/CN2013/076167, filed on May 23, 2013. All of the aforementioned patent applications are hereby incorporated by reference in their entireties.

TECHNICAL FIELD

Embodiments relate to communications technologies, and in particular, to a location area management method and a device.

BACKGROUND

With development of communications technologies, the Third Generation Partnership Project (3GPP) performs research and standardization work on a Long Term Evolution (LTE) technology, expecting to obtain a higher speed, a higher capacity, and better user performance. At a preliminary stage of LTE deployment, an LTE network is deployed only in a hotspot area, but full coverage is performed by a 2G/3G network. In an area where multiple types of wireless networks overlap or are adjacent, when a UE (user equipment) moves back and forth between an LTE network and a 2G/3G network, inter-system cell reselection needs to be performed for the UE. Each time of the inter-system cell reselection leads to a location update process of the UE, so as to update location information that is of the UE and that is registered on a core network, which causes a large increase in signaling load on a network and an air interface.

To resolve the foregoing problem, the 3GPP introduces an idle state signaling reduction (ISR) mechanism. After the ISR mechanism is activated, when a UE moves in a coverage area in which the UE is registered, even moves across a standard, no location update needs to be performed. Although by using the ISR mechanism, a location update can be prevented from frequently occurring, location area management of different network standards is implemented by different core network nodes. In essence, location area management of various network standards is independently performed, and cannot be performed in an effectively collaborative manner, which causes a complex mobility management procedure, and is not helpful in optimization and evolution of a network architecture.

SUMMARY

Embodiments provide a location area management method and a device, so as to manage location areas of different network standards together, and improve a location area management effect.

According to a first aspect, an embodiment provides a location area management method, including: receiving, by a single radio controller, a first request message, where the first request message is used by a UE to request a location update; generating, by the single radio controller, a paging area list of the UE according to the first request message, where the paging area list includes a location area identity of a location area of at least one network standard; and adding, by the single radio controller, the paging area list of the UE to a first response message, and sending the first response message to the UE.

With reference to the first aspect, in a first possible implementation manner, the location area identity of a location area of at least one network standard includes one or more of a tracking area identity (TAI), a routing area identity (RAI), and a cell identity.

With reference to the first possible implementation manner of the first aspect, in a second possible implementation manner, the first request message carries a subscriber identity of the UE; and the generating, by the single radio controller, a paging area list of the UE according to the first request message includes: determining, by the single radio controller according to the subscriber identity of the UE, whether a location area hierarchical management context of the UE is stored; and if it is determined that the location area hierarchical management context of the UE is not stored, sending a second request message to a first core network controller, where the second request message carries a single radio controller identity used to indicate the single radio controller and the subscriber identity of the UE, so that the first core network controller registers the UE according to the single radio controller identity and the subscriber identity of the UE, and the single radio controller receives a second response message sent by the first core network controller, establishes the location area hierarchical management context of the UE, and generates the paging area list of the UE; and/or if it is determined that the location area hierarchical management context of the UE is stored, generating the paging area list of the UE.

With reference to the first aspect or either of the first and the second possible implementation manners of the first aspect, in a third possible implementation manner, the first request message further carries hierarchical location update indication information, and the hierarchical location update indication information is used to indicate that the UE supports the single radio controller in performing a location update on the UE; the generating, by the single radio controller, a paging area list of the UE according to the first request message includes: determining, by the single radio controller according to the hierarchical location update indication information, whether the UE supports the single radio controller in performing a location update on the UE, and if it is determined that the UE supports the single radio controller in performing a location update on the UE, generating, by the single radio controller, the paging area list of the UE according to the first request message.

With reference to the first aspect or the second possible implementation manner of the first aspect, in a fourth possible implementation manner, the first request message carries a first non-access stratum (NAS) message, the first NAS message carries hierarchical location update indication information, and the hierarchical location update indication information is used to indicate that the UE supports the single radio controller in performing a location update on the UE; and the generating, by the single radio controller, a paging area list of the UE according to the first request message includes: sending, by the single radio controller, the first NAS message to a second core network controller, so that the second core network controller registers the UE according to the first NAS message; receiving, by the single radio controller, a location area hierarchical management indication message sent by the second core network controller, where the location area hierarchical management indication message is sent after the second core network controller registers the UE according to the first NAS message and determines, according to the hierarchical location update indication information, that the UE supports the single radio controller in performing a location update on the UE; and establishing, by the single radio controller, a location area hierarchical management context of the UE, and generating the paging area list of the UE.

With reference to the first aspect or any one of the first to the fourth possible implementation manners of the first aspect, in a fifth possible implementation manner, the generating the paging area list of the UE includes: acquiring, by the single radio controller, a location area in which the UE is currently located; and generating, by the single radio controller, the paging area list of the UE according to the location area in which the UE is currently located and a preset topology mapping table and/or a preset network policy.

With reference to the first aspect or any one of the first to the fourth possible implementation manners of the first aspect, in a sixth possible implementation manner, the first request message carries first location area information used to indicate a location area accessed by the UE last time; and the generating the paging area list of the UE includes: acquiring, by the single radio controller, a location area in which the UE is currently located; determining, by the single radio controller, a movement track of the UE according to the location area in which the UE is currently located and the first location area information; and generating, by the single radio controller, the paging area list of the UE according to the movement track of the UE; where the paging area list of the UE includes at least a location area identity of the location area in which the UE is currently located.

With reference to the first aspect or any one of the first to the sixth possible implementation manners of the first aspect, in a seventh possible implementation manner, the first response message further carries duration information of a location update timer; and after the adding, by the single radio controller, the paging area list of the UE to a first response message, and sending the first response message to the UE, the method further includes: starting, by the single radio controller, the location update timer, and if a message sent by the UE is still not received when the location update timer expires, deleting the location area hierarchical management context of the UE, where duration of the location update timer is duration indicated by the duration information of the location update timer.

With reference to the first aspect or any one of the first to the seventh possible implementation manners of the first aspect, in an eighth possible implementation manner, the method further includes: when receiving a UE context release request message or resource release request message of the UE, deleting, by the single radio controller, the location area hierarchical management context of the UE.

With reference to the first aspect or any one of the first to the eighth possible implementation manners of the first aspect, in a ninth possible implementation manner, the method further includes: receiving, by the single radio controller, a first paging message sent by a third core network controller, where the first paging message carries the subscriber identity of the UE; and acquiring, by the single radio controller, the paging area list of the UE according to the subscriber identity of the UE, and sending a second paging message to a location area recorded in the paging area list of the UE.

According to a second aspect, an embodiment provides a single radio controller, including: a receiving unit, configured to receive a first request message, where the first request message is used by a user equipment UE to request a location update; a processing unit, configured to generate a paging area list of the UE according to the first request message received by the receiving unit, where the paging area list includes a location area identity of a location area of at least one network standard; and a sending unit, configured to: add the paging area list of the UE generated by the processing unit to a first response message, and send the first response message to the UE.

In a first possible implementation manner, the location area identity of a location area of at least one network standard includes one or more of a tracking area identity TAI, a routing area identity RAI, and a cell identity.

With reference to the first possible implementation manner of the second aspect, in a second possible implementation manner, the first request message carries a subscriber identity of the UE; the processing unit is further configured to: determine, according to the subscriber identity of the UE, whether a location area hierarchical management context of the UE is stored; and if it is determined that the location area hierarchical management context of the UE is stored, generate the paging area list of the UE, and/or if it is determined that the location area hierarchical management context of the UE is not stored, send a notification message to instruct the sending unit to send a second request message to a first core network controller, where the second request message carries a single radio controller identity used to indicate the single radio controller and the subscriber identity of the UE, so that the first core network controller registers the UE according to the single radio controller identity and the subscriber identity of the UE; the sending unit is further configured to: when the processing unit determines, according to the subscriber identity of the UE, that the location area hierarchical management context of the UE is not stored, receive the notification message sent by the processing unit, and send the second request message to the first core network controller; and the receiving unit is further configured to: after the sending unit sends the second request message, receive a second response message sent by the first core network controller, establish the location area hierarchical management context of the UE, and generate the paging area list of the UE.

With reference to the second aspect or the first or the second possible implementation manner of the second aspect, in a third possible implementation manner, the first request message further carries hierarchical location update indication information, and the hierarchical location update indication information is used to indicate that the UE supports the single radio controller in performing a location update on the UE; the processing unit is further configured to: determine, according to the hierarchical location update indication information, whether the UE supports the single radio controller in performing a location update on the UE, and if it is determined that the UE supports the single radio controller in performing a location update on the UE, generate the paging area list of the UE according to the first request message.

With reference to the second aspect or the first or the second possible implementation manner of the second aspect, in a fourth possible implementation manner, the first request message further carries a first non-access stratum NAS message, the first NAS message carries hierarchical location update indication information, and the hierarchical location update indication information is used to indicate that the UE supports the single radio controller in performing a location update on the UE; the sending unit is further configured to send the first NAS message to a second core network controller, so that the second core network controller registers the UE according to the first NAS message; the receiving unit is further configured to receive a location area hierarchical management indication message sent by the second core network controller, where the location area hierarchical management indication message is sent after the second core network controller registers the UE according to the first NAS message and determines, according to the hierarchical location update indication information, that the UE supports the single radio controller in performing a location update on the UE; and the processing unit is further configured to: establish the location area hierarchical management context of the UE, and generate the paging area list of the UE.

With reference to the second aspect or any one of the first to the fourth possible implementation manners of the second aspect, in a fifth possible implementation manner, the processing unit is further configured to: acquire a location area in which the UE is currently located; and generate the paging area list of the UE according to the location area in which the UE is currently located and a preset topology mapping table and/or a preset network policy.

With reference to the second aspect or any one of the first to the fourth possible implementation manners of the second aspect, in a sixth possible implementation manner, the first request message carries first location area information used to indicate a location area accessed by the UE last time, and the processing unit is further configured to: acquire a location area in which the UE is currently located; determine a movement track of the UE according to the location area in which the UE is currently located and the first location area information; and generate the paging area list of the UE according to the movement track of the UE; where the paging area list of the UE includes at least a location area identity of the location area in which the UE is currently located.

With reference to the second aspect or any one of the first to the sixth possible implementation manners of the second aspect, in a seventh possible implementation manner, the first response message further carries duration information of a location update timer; and the processing unit is further configured to: start the location update timer, and if a message sent by the UE is still not received by the receiving unit when the location update timer expires, delete the location area hierarchical management context of the UE, where duration of the location update timer is duration indicated by the duration information of the location update timer.

With reference to the second aspect or any one of the first to the seventh possible implementation manners of the second aspect, in an eighth possible implementation manner, the processing unit is further configured to: when a UE context release request message or resource release request message of the UE is received by using the receiving unit, delete the location area hierarchical management context of the UE.

With reference to the second aspect or any one of the first to the eighth possible implementation manners of the second aspect, in a ninth possible implementation manner, the receiving unit is further configured to receive a first paging message sent by a third core network controller, where the first paging message carries the subscriber identity of the UE; the processing unit is further configured to acquire the paging area list of the UE according to the subscriber identity of the UE; and the sending unit is further configured to send a second paging message to a location area recorded in the paging area list of the UE, where the second paging message carries the subscriber identity of the UE.

According to a third aspect, an embodiment provides a location area management method, including: requesting, by a user equipment UE, a single radio controller to perform a location update on the UE, so that the single radio controller receives a first request message, where the first request message is used to request the single radio controller to perform a location update on the UE, and after generating a paging area list of the UE according to the first request message, the single radio controller sends the paging area list of the UE to the UE, where the paging area list includes a location area identity of a location area of at least one network standard; and receiving, by the UE, the paging area list of the UE, so that the UE performs location update determining according to the paging area list.

With reference to the third aspect, in a first possible implementation manner, the requesting, by a user equipment UE, a single radio controller to perform a location update on the UE includes: sending, by the UE, a third request message to an access network device, so that the access network device sends the first request message to the single radio controller according to the third request message, where the third request message is used to request the single radio controller to perform a location update on the UE; or sending, by the UE, the first request message to the single radio controller; where the first request message and the third request message carry hierarchical location update indication information, and the hierarchical location update indication information is used to indicate that the UE supports the single radio controller in performing a location update on the UE.

With reference to the third aspect, in a second possible implementation manner, the requesting, by a user equipment UE, a single radio controller to perform a location update on the UE includes: sending, by the UE, a first non-access stratum NAS message to an access network device, so that the access network device adds the first NAS message to the first request message, and sends the first request message to the single radio controller; or sending, by the UE, the first request message to the single radio controller, where the first request message includes the first NAS message; where the first NAS message carries hierarchical location update indication information, and the hierarchical location update indication information is used to indicate that the UE supports the single radio controller in performing a location update on the UE.

According to a fourth aspect, an embodiment provides a location area management method, including: receiving, by a core network controller, a second request message sent by a single radio controller, where the second request message carries a single radio controller identity used to indicate the single radio controller and a subscriber identity of the UE; registering, by the core network controller, the UE according to the single radio controller identity and the subscriber identity of the UE; and sending, by the core network controller, a second response message to the single radio controller, so that, according to the second response message, the single radio controller establishes a location area hierarchical management context of the UE and generates a paging area list of the UE.

With reference to the fourth aspect, in a first possible implementation manner, the location area management method further includes: sending, by the core network controller, a first paging message to the single radio controller, where the first paging message carries the subscriber identity of the UE, so that the single radio controller acquires the paging area list of the UE according to the subscriber identity of the UE, and sends a second paging message to a location area recorded in the paging area list of the UE, where the second paging message carries the subscriber identity of the UE.

With reference to the fourth aspect or the first possible implementation manner of the fourth aspect, in a second possible implementation manner, the second request message includes a first non-access stratum NAS message, the first NAS message carries hierarchical location update indication information, and the hierarchical location update indication information is used to indicate that the user equipment UE supports the single radio controller in performing a location update on the UE; and after the registering, by the core network controller, the UE according to the single radio controller identity and the subscriber identity of the UE, the method further includes: determining, by the core network controller according to the hierarchical location update indication information, whether the UE supports the single radio controller in performing a location update on the UE, and if it is determined that the UE supports the single radio controller in performing a location update on the UE, sending the second response message to the single radio controller, so that the single radio controller establishes the location area hierarchical management context of the UE, and generates the paging area list of the UE.

According to a fifth aspect, an embodiment provides a user equipment, including: a sending unit, configured to request a single radio controller to perform a location update on the UE, so that the single radio controller receives a first request message, where the first request message is used to request the single radio controller to perform a location update on the UE, and after generating a paging area list of the UE according to the first request message, the single radio controller sends the paging area list of the UE to the UE, where the paging area list includes a location area identity of a location area of at least one network standard; and a receiving unit, configured to receive the paging area list of the UE sent by the single radio controller, so that the UE performs location update determining according to the paging area list.

With reference to the fifth aspect, in a first possible implementation manner, the sending unit is further configured to: send a third request message to an access network device, so that the access network device sends the first request message to the single radio controller according to the third request message, where the third request message is used to request the single radio controller to perform a location update on the UE; or send the first request message to the single radio controller; where the first request message and the third request message carry hierarchical location update indication information, and the hierarchical location update indication information is used to indicate that the UE supports the single radio controller in performing a location update on the UE.

With reference to the fifth aspect, in a second possible implementation manner, the sending unit is further configured to: send a first non-access stratum NAS message to an access network device, so that the access network device adds the first NAS message to the first request message, and sends the first request message to the single radio controller; or send the first request message to the single radio controller, where the first request message includes the first NAS message; where the first NAS message carries hierarchical location update indication information, and the hierarchical location update indication information is used to indicate that the UE supports the single radio controller in performing a location update on the UE.

According to a sixth aspect, an embodiment provides a core network controller, including: a receiving unit, configured to receive a second request message sent by a single radio controller, where the second request message carries a single radio controller identity used to indicate the single radio controller and a subscriber identity of a user equipment UE; a registration unit, configured to register the UE according to the single radio controller identity and the subscriber identity of the UE that are received by the receiving unit; and a sending unit, configured to: after the registration unit completes registration of the UE, send a second response message to the single radio controller, so that, according to the second response message, the single radio controller establishes a location area hierarchical management context of the UE and generates a paging area list of the UE.

With reference to the sixth aspect, in a first possible implementation manner, the sending unit is further configured to send a first paging message to the single radio controller, where the first paging message carries the subscriber identity of the UE, so that the single radio controller acquires the paging area list of the UE according to the subscriber identity of the UE, and sends a second paging message to a location area recorded in the paging area list of the UE, where the second paging message carries the subscriber identity of the UE.

According to the location area management method and the device provided in the embodiments, a single radio controller receives a first request message, where the first request message is used to request the single radio controller to perform a location update on a UE; generates a paging area list of the UE according to the first request message, where the paging area list includes a location area identity of a location area of at least one network standard; and adds the paging area list of the UE to a first response message, and sends the first response message to the UE, thereby implementing an efficient dynamic paging area with the UE being a center, and improving a location area management effect. In addition, the single radio controller manages location areas of different network standards together, thereby implementing collaboration on an inter-standard location update.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 5 is a schematic structural diagram of a second single radio controller according to an embodiment;

FIG. 6 is a flowchart of a fourth location area management method according to an embodiment;

FIG. 7 is a flowchart of a fifth location area management method according to an embodiment;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that in the following embodiments of the present invention, a single radio controller (SRC) is configured to manage access network devices of different network standards together. There may be one or more access network devices of different network standards. Specifically, on an LTE network, the access network device may be an eNB (evolved Node B); on a 2G network, the access network device may be a BSC (base station controller); and on a 3G network, the access network device may be an RNC (radio network controller). The single radio controller may be an independent network device, or may be integrated into another network element on a network side. For example, the single radio controller is integrated into an access network device, that is, may be integrated into a BSC or an RNC. Alternatively, the single radio controller, a BSC, and an RNC may be integrated together. In the following embodiments, a single radio controller and an access network device are separated for description, but the present invention is not limited to an application scenario in which the single radio controller and the access network device are separately disposed. When the single radio controller and the access network device are disposed integrally, communication between the single radio controller and the access network device may be implemented based on an intra-device module communication manner in the prior art.

Figure 1:
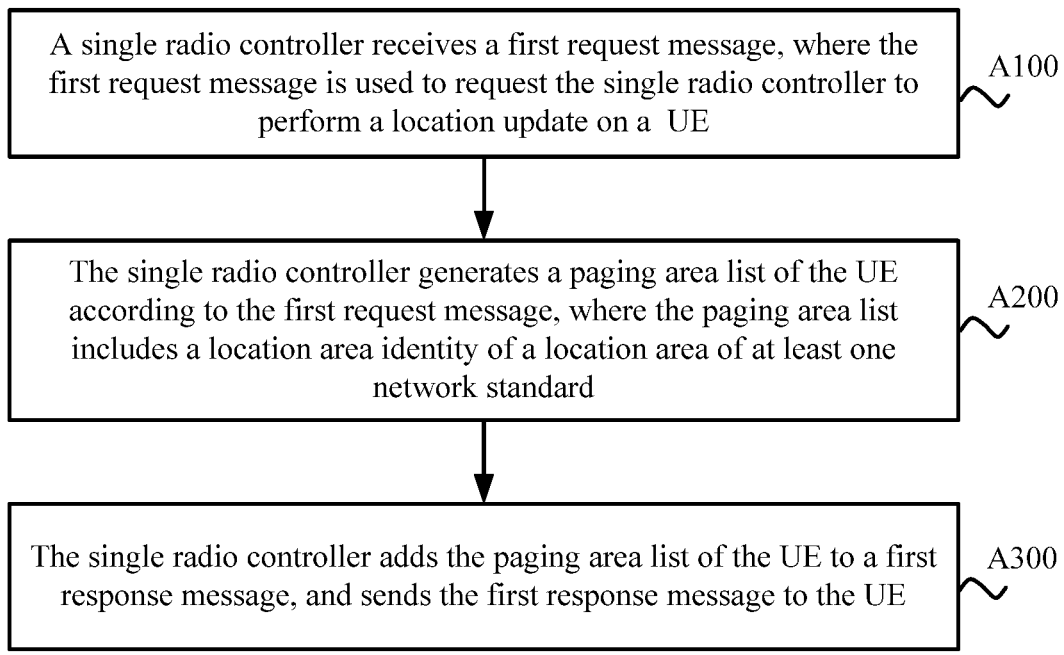
FIG. 1 is a flowchart of a first location area management method according to an embodiment.

FIG. 1 is a flowchart of a first location area management method according to an embodiment. As shown in FIG. 1, the location area management method provided in this embodiment may be specifically applied to a location area management process of a wireless communication system, where the wireless communication system may include two network standards, for example, an application scenario in which an LTE network and a 2G/3G network co-exist. The 2G network includes a GSM (Global System for Mobile Communications) network and the like, and the 3G network includes a WCDMA (Wideband Code Division Multiple Access) network, a TD-SCDMA (Time Division-Synchronous Code Division Multiple Access) network, and the like. A network element on the LTE network may specifically include a P-GW (packet data network gateway), an S-GW (serving gateway), an MME (Mobility Management Entity, mobility management entity), and an eNB. A network element on the 2G network may specifically include a P-GW, an S-GW, an SGSN (serving GPRS support node), a BTS (base transceiver station), and a BSC. A network element on the 3G network may specifically include a P-GW, an S-GW, an SGSN, a Node B (Node B), and an RNC. For ease of description, in the following embodiments, the application scenario in which the LTE network and the 2G/3G network co-exist is used for description, but the present invention is not limited thereto.

The location area management method provided in this embodiment of the present invention specifically includes the following steps.

Step A100: A single radio controller receives a first request message, where the first request message is used to request the single radio controller to perform a location update on a UE.

The location update may be a periodical location update of the UE, a location update initiated when the UE moves to another unregistered location area, a location update initiated by the UE in an RRC connection setup procedure, a location update initiated by the UE in a connected state in an uplink information transfer process, or a location update initiated in a process in which the UE attaches to a network, which is not limited herein.

When the single radio controller and an access network device are integrated, the first request message may be directly sent by the UE to the single radio controller, where the first request message may be an uplink information transfer message (Uplink Information Transfer) or a radio resource control (RRC) connection setup complete message. For example, when the UE initiates a location update in an RRC connection setup procedure, the first request message sent by the UE is an RRC connection setup complete message, where the message is used to request the single radio controller to perform a location update on the UE. When the single radio controller and the access network device are independent of each other, the first request message is sent by the access network device, where when the UE initiates a location update, the UE sends a message to trigger the access network device to send the first request message. For example, when in a connected state, the UE sends an uplink information transfer message to the access network device to request a location update; and after receiving the uplink information transfer message, the access network device generates the first request message to request the single radio controller to perform a location update on the UE. In this case, the first request message may be defined according to an interface between the single radio controller and the access network device, which is not limited.

The first request message may also be an internal message of the single radio controller. For example, when a coverage range of a location area managed by the single radio controller changes, an update is performed on a location area, a preset network policy changes, or a preset topology mapping table changes, the single radio controller generates the first request message inside, so as to trigger the single radio controller to perform a location update on the UE. Therefore, it is implemented that the single radio controller actively generates and updates a paging area list of the UE, so that the single radio controller can quickly respond to a change of a location area within a coverage range of the single radio controller, and real-time performance and effectiveness of the paging area list are significantly improved.

Step A200: The single radio controller generates a paging area list (PAL) of the UE according to the first request message, where the paging area list includes a location area identity of a location area of at least one network standard.

The foregoing location area identity of a location area of at least one network standard may include one or more of a tracking area identity, a routing area identity, and a cell identity. For example, the paging area list may include one or more TAIs and one or more RAIs. Apparently, the foregoing location area may be one or more of a tracking area, a routing area, and a cell.

Step A300: The single radio controller adds the paging area list of the UE to a first response message, and sends the first response message to the UE.

The first response message may be a downlink information transfer message or an RRC connection reconfiguration message, which is not limited herein.

It should be noted that after the UE receives the paging area list, when the UE is in an idle state, and moves in location areas recorded in the paging area list, except a periodical location update, no location update needs to be initiated. That is, the paging area list is used by the UE for location update determining.

Optionally, generation of the paging area list of the UE in the foregoing step A200 may specifically include step A200a and step A200b.

Step A200a: The single radio controller acquires a location area in which the UE is currently located.

Specifically, when the single radio controller and the access network device are independent of each other, the location area in which the UE is currently located may be added by the access network device to the first request message and sent to the single radio controller; or may be reported in real time by the access network device to the single radio controller, where after receiving the first request message, the single radio controller acquires the location area in which the UE is currently located; or may be sent by the UE to the access network device, and then sent by the access network device to the single radio controller by using the first request message. When the single radio controller and the access network device are integrated, after receiving the first request message, the single radio controller may directly acquire the location area in which the UE is currently located, or the single radio controller may search a preset relationship table between a cell and a location area according to a cell in which the UE is located, to acquire the location area in which the UE is currently located. Details are not described herein again.

Step A200b: The single radio controller generates the paging area list of the UE according to the location area in which the UE is currently located and a preset topology mapping table and/or a preset network policy.

Specifically, the single radio controller generates the paging area list of the UE according to the location area in which the UE is currently located and the preset topology mapping table on the single radio controller.

The preset topology mapping table is used to indicate a coverage relationship between location areas that are of different network standards and that are managed by the single radio controller. The preset topology mapping table may be one table, or may be multiple tables, for example, may be a table of a location relationship between location areas of different network standards, a relationship table of adjacent location areas of each network standard, a relationship table of adjacent cells of different network standards, or a relationship table of adjacent cells of each network standard, or may be a combination thereof, which is not limited herein.

For example, an adjacent location area of the location area in which the UE is currently located may be determined according to the location area in which the UE is currently located and the preset topology mapping table, and a location area identity of the location area in which the UE is currently located and a location area identity of the adjacent location area are generated into the paging area list of the UE. Alternatively, a mapped-to location area that is of another network standard and that is of the location area in which the UE is currently located may be determined according to a mapping relationship table of location areas of different network standards. For example, a tracking area that is on an LTE network and in which the UE is currently located is mapped to a routing area on a 2G/3G network according to network topology information that is of different network standards and that is grasped by the single radio controller, and the paging area list of the UE is generated.

Specifically, the paging area list of the UE is generated according to the location area in which the UE is currently located and the preset network policy. The preset network policy may be setting a location area in the paging area list of the UE as a fixed location area within a preset period of time.

For example, in a location area, a user moves only in a fixed location area within a fixed period of time; therefore, if the location area in which the UE is currently located is the fixed location area within a preset period of time, the paging area list of the UE includes only the fixed location area, and there is no need to configure another location area for the user, thereby significantly reducing a paging volume. Alternatively, a quantity of paging location areas of the UE may be reduced when paging resources on a network side reach a preset threshold, which is not limited herein.

Optionally, when the first request message carries first location area information used to indicate a location area accessed by the UE last time, the generation of the paging area list of the UE in the foregoing step A200 may specifically include that the single radio controller acquires the location area in which the UE is currently located, and the single radio controller determines a movement track of the UE according to the location area in which the UE is currently located and the first location area information; and the single radio controller generates the paging area list of the UE according to the movement track of the UE.

The paging area list of the UE includes at least the location area identity of the location area in which the UE is currently located. The location area accessed by the UE last time may be a location area in which the UE is located before moving to the current location area, and a network standard of the location area accessed by the UE last time and a network standard of the location area in which the UE is currently located may be different, or may be the same, which is not limited herein.

For example, on a railway line, the movement track of the UE is regular. The single radio controller can determine, according to the location area in which the UE is currently located and the first location area information of the location area accessed by the UE last time, that the UE moves away from the location area accessed last time, and moves close to the location area in which the UE is currently located, and can determine a movement direction of the UE by using a coverage relationship between location areas on the railway line, so that the movement track of the UE is determined, and a location area ahead of the UE may be determined according to the movement track of the UE. The paging area list of the UE may be generated by combining location area identities of the location area in which the UE is currently located and the location area ahead. The coverage relationship between the location areas on the railway line may be indicated by using the preset topology mapping table. For details, refer to related descriptions in step A200b. Specifically, four continuously covered location areas A, B, C, and D on the railway line are used as an example, where A is connected to B, B is connected to C, and C is connected to D. Assuming that the location area accessed by the UE last time is B, and the location area in which the UE is currently located is C, the single radio controller may determine that the UE moves from B to C, and further, may determine, according to the coverage relationship between the location areas on the railway line, that the location area ahead of the UE is D.

The paging area list of the UE generated by using the foregoing method may be corresponding to the movement track of the UE, so that a location area indicated in the paging area list is on the movement track of the UE, and effectiveness of the paging area list is further improved; therefore when the UE moves along the movement track, except a periodical location update, no location update needs to be initiated.

Optionally, in the foregoing step 200, reference may further be made to a wireless capability of the UE, that is, a network standard supported by the UE.

In the foregoing step A300, the single radio controller sends the paging area list to the UE by using the first response message. In a practical application process, when the single radio controller and the access network device are independent of each other, the first response message may be sent by the single radio controller to the access network device, and then sent by the access network device to the UE. After the UE receives the paging area list, in a process of moving in location areas recorded in the paging area list, except a periodical location update, no location update needs to be initiated.

Specifically, when the single radio controller and the access network device are independent of each other, that the single radio controller adds the paging area list of the UE to a first response message, and sends the first response message to the UE in step A300 may include that: the single radio controller adds the paging area list of the UE to the first response message, and sends the first response message to the access network device, so that the access network device adds the paging area list of the UE to a downlink information transfer message or an RRC connection reconfiguration message, and sends the downlink information transfer message or the RRC connection reconfiguration message to the UE.

According to the location area management method provided in this embodiment, a single radio controller receives a first request message, where the first request message is used to request the single radio controller to perform a location update on a UE; generates a paging area list of the UE according to the first request message, where the paging area list includes a location area identity of a location area of at least one network standard; and adds the paging area list of the UE to a first response message, and sends the first response message to the UE, thereby implementing an efficient dynamic paging area with the UE being a center, and improving a location area management effect. In addition, the single radio controller manages location areas of different network standards together, thereby implementing collaboration on an inter-standard location update, and simplifying mobility management of inter-standard movement of the UE.

Optionally, in a first implementation scenario in this instance, the first request message may further carry hierarchical location update indication information, where the hierarchical location update indication information is used to indicate that the UE supports the single radio controller in performing a location update on the UE. That the single radio controller generates a paging area list of the UE according to the first request message in step A200 includes that the single radio controller determines, according to the hierarchical location update indication information, whether the UE supports the single radio controller in performing a location update on the UE, and if it is determined that the UE supports the single radio controller in performing a location update on the UE, the single radio controller generates the paging area list of the UE according to the first request message.

It should be pointed out that if it is determined, according to the hierarchical location update indication information in the first request message, that the UE does not support the single radio controller in performing a location update on the UE, a core network device may complete the generation of the paging area list, which is not limited herein.

The following makes a description by using several specific implementation manners, and in the following implementation manners, the single radio controller and the access network device are independent network devices.

In manner 1, the hierarchical location update indication information may be carried by the UE to the access network device by using an RRC connection setup complete message or an uplink information transfer message, and then is sent by the access network device to the single radio controller by using the first request message.

For example, when an RRC connection setup is being performed between the UE and the access network device, first, the UE sends an RRC connection setup request message (RRC Connection Request) to the access network device, where the RRC connection setup request message may carry a subscriber identity of the UE; the access network device sends an RRC connection setup message (RRC Connection Setup) to the UE; the UE sends an RRC connection setup complete message (RRC Connection Setup Complete) to the access network device, where the RRC connection setup complete message carries the hierarchical location update indication information; and finally, the access network device sends the first request message to the single radio controller, where the first request message carries the hierarchical location update indication information.

In manner 2, the hierarchical location update indication information may be carried in a non-access stratum (NAS) message. The UE adds the NAS message to an RRC connection setup complete message or an uplink information transfer message, and sends the RRC connection setup complete message or the uplink information transfer message to the access network device, and then the RRC connection setup complete message or the uplink information transfer message is added by the access network device to the first request message and sent to the single radio controller.

In the foregoing implementation scenario, when determining that the UE supports the single radio controller in performing a location update on the UE, the single radio controller generates the paging area list of the UE, which avoids generation of a paging area list for UE that does not support the single radio controller in performing a location update, and saves operation time.

Optionally, in a second implementation scenario in this embodiment, the first response message further carries duration information of a location update timer. After step A300, the method further includes: starting, by the single radio controller, the location update timer, and if a message sent by the UE is still not received when the location update timer expires, deleting a location area hierarchical management context of the UE.

Duration of the location update timer is duration indicated by the duration information of the location update timer, and is used by the UE to perform a periodical location update according to the duration of the location update timer.

Specifically, the single radio controller sends the first response message to the UE, and meanwhile, starts the location update timer. If the single radio controller does not receive a periodical location update request message or another interactive message from the UE from start to expiration of the location update timer, the single radio controller deletes the location area hierarchical management context of the UE.

Optionally, in a third implementation scenario in this embodiment, the foregoing method may further include: when receiving a UE context release request message or resource release request message of the UE, deleting, by the single radio controller, the location area hierarchical management context of the UE.

Specifically, after the UE is handed over from one single radio controller to another single radio controller, and for ease of description, the single radio controller before the handover is referred to as an old single radio controller, and the single radio controller after the handover becomes a new single radio controller, when receiving a UE context release request message or resource release request message sent by a CC, the new single radio controller, or an access network device, the old single radio controller deletes the location area hierarchical management context of the UE.

In the foregoing second and third implementation scenarios in this instance, the single radio controller is triggered, by using a timer or a message, to delete the location area hierarchical management context of the UE, which can not only release storage space of the single radio controller, but also clear in time historical information of the UE on the single radio controller, thereby avoiding expansion of an unnecessary paging range when the location area hierarchical management context of the UE is still stored after the UE moves out of a coverage range of the single radio controller, also avoiding use of stored old information when the UE accesses the single radio controller again, and avoiding a paging failure caused by a paging range error.

Optionally, in a fourth implementation scenario in this embodiment, the method further includes: receiving, by the single radio controller, a first paging message sent by a third core network controller (CC), where the first paging message carries the subscriber identity of the UE; and acquiring, by the single radio controller, the paging area list of the UE according to the subscriber identity of the UE, and sending a second paging message to a location area recorded in the paging area list of the UE, where the second paging message carries the subscriber identity of the UE. Specifically, the single radio controller may store the paging area list of the UE after generating the paging area list of the UE in step A200, and enables the paging area list of the UE to be acquired by using the subscriber identity of the UE. For example, the paging area list may be directly stored on the single radio controller, or may be stored on another device, which is not limited herein.

The core network controller is a newly added network element, can perform mobility management on the single radio controller, and may be connected to one or more single radio controllers, where the single radio controller may communicate with the CC by using a connection interface such as an SR (Single Radio) interface. Hierarchical management of location areas can be implemented by means of cooperation between the single radio controller and the CC. For example, the CC registers the UE according to a single radio controller identity and the subscriber identity of the UE, which implements inter-single radio controller mobility management of the UE by the CC. The single radio controller is responsible for managing location areas that are of different standards and that are within the coverage range of the single radio controller, which implements mobility management of the UE in a location area of the single radio controller, and therefore, implements hierarchical management of location areas. When the UE is being paged, the CC can quickly determine a single radio controller serving the UE, and send a paging message to the single radio controller, and the single radio controller determines a paged location area according to a stored paging area list that is of the UE and that is in a hierarchical management context, and sends the paging message to the determined paged location area.

Specifically, when the UE is in an idle state, downlink data of the UE reaches a P-GW, the P-GW sends the downlink data to an S-GW, the S-GW sends a downlink data notification message to the CC, the CC sends a first paging message to the single radio controller, and the single radio controller performs paging according to a location area identity recorded in the paging area list. Preferably, location area identities of all network standards are recorded in the paging area list. The single radio controller determines, according to one or more TAIs recorded in the paging area list, one or more location areas and eNBs that serve the location areas, and sends a paging message by using a corresponding Si interface; and determines, according to one or more RAIs recorded in the paging area list, one or more location areas and BSCs/RNCs that serve the location areas, and sends a paging message by using a corresponding Iu/Gb interface.

Figure 2:
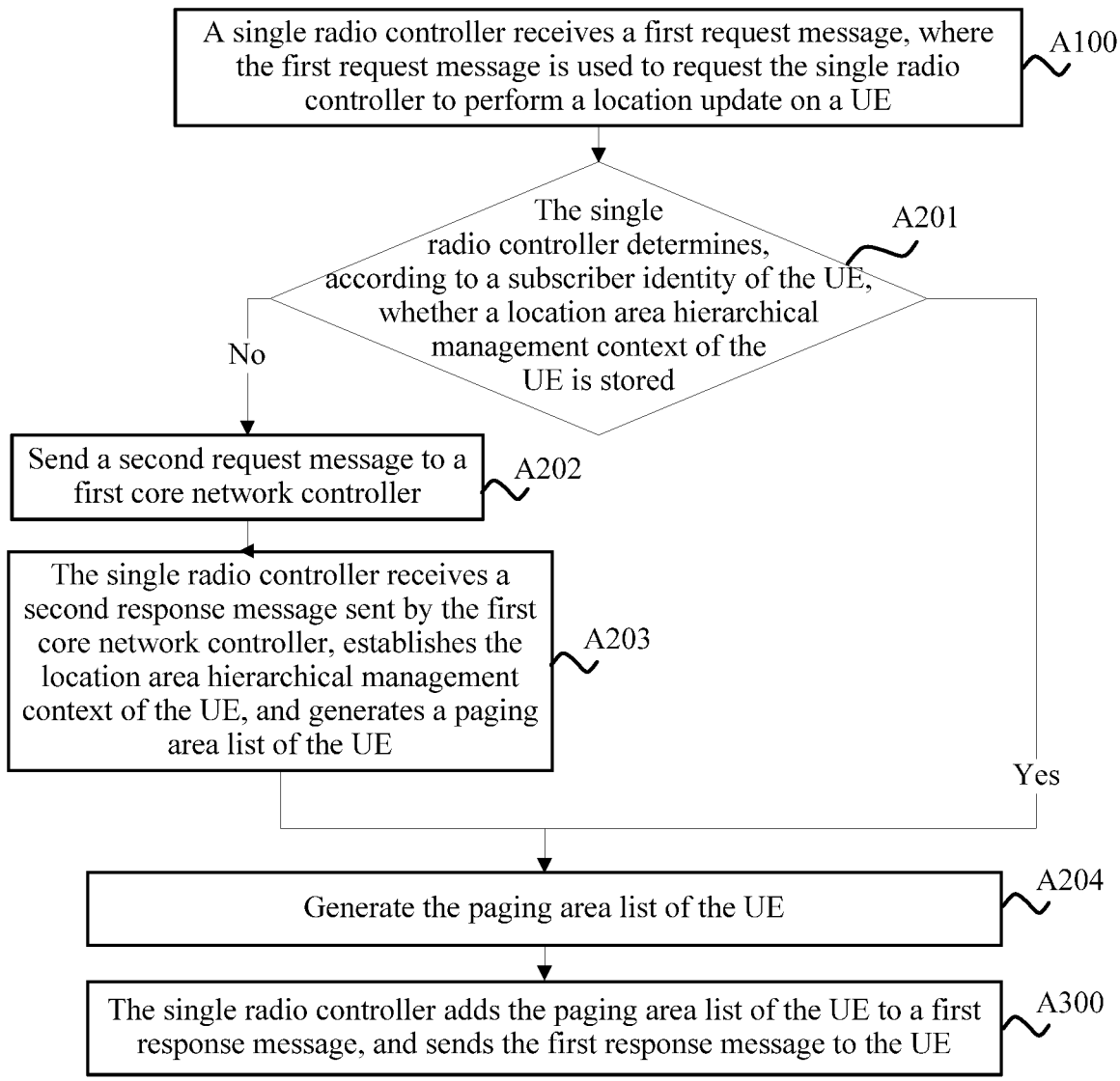
FIG. 2 is a flowchart of a second location area management method according to an embodiment.

FIG. 2 is a flowchart of a second location area management method according to an embodiment. As shown in FIG. 2, in this embodiment, the foregoing first request message carries the subscriber identity of the UE. Accordingly, that the single radio controller generates a paging area list of the UE according to the first request message in step A200 may include the following steps.

Step A201: The single radio controller determines, according to the subscriber identity of the UE, whether a location area hierarchical management context of the UE is stored; and if it is determined that the location area hierarchical management context of the UE is not stored, executes step A202 and step A203, and/or if it is determined that the location area hierarchical management context of the UE is stored, executes step A204.

The location area hierarchical management context may include the identity (such as a permanent identity or a temporary identity) and the paging area list that are of the UE, and may further include information, such as related information of a core network controller with which the UE is registered, a network standard of the UE during a last-time update, and a location area in which the UE is located during a last-time update.

Step A202: Send a second request message to a first core network controller, where the second request message carries a single radio controller identity used to indicate the single radio controller and the subscriber identity of the UE, so that the first core network controller registers the UE according to the single radio controller identity and the subscriber identity of the UE.

The first core network controller and the third core network controller that is in the embodiment shown in FIG. 1 may be the same, or may be different, which is not limited herein.

Specifically, the first request message may carry identification information used to indicate the first core network controller, where the identification information may be implemented by using a GUMMEI (globally unique MME identifier). The single radio controller may determine a corresponding core network controller according to the identification information, and send the second request message to the corresponding core network controller, so as to register that the UE is in an area controlled by the single radio controller.

Step A203: The single radio controller receives a second response message sent by the first core network controller, establishes the location area hierarchical management context of the UE, and generates the paging area list of the UE.

Step A204: Generate the paging area list of the UE.

It should be pointed out that when the location area hierarchical management context of the UE includes the paging area list of the UE, the method further includes updating the paging area list in the location area hierarchical management context of the UE.

For the paging area list in steps A203 and A204 and how the paging area list of the UE is generated, refer to related descriptions in step A200. Details are not described herein again.

The subscriber identity of the UE may be specifically a permanent identity such as an IMSI (International Mobile Subscriber Identity), a temporary identity such as a TMSI (Temporary Mobile Subscriber Identity), or a uniform identity allocated by a core network controller to the UE by considering all UEs.

It should be noted that when the access network device and the single radio controller are two independent network devices, the access network device first receives a message that is sent by the UE and that carries the subscriber identity of the UE, where the message is used to request a location update; and then sends the first request message to the single radio controller. Apparently, the first request message includes content of the message sent by the UE, and in addition, information about a location area in which the UE is currently located may be added, and then the first request message is sent to the single radio controller, which is not limited herein.

When receiving the first request message, the single radio controller determines, according to the subscriber identity of the UE, whether the location area hierarchical management context of the UE is stored; and if it is determined that the location area hierarchical management context of the UE is stored, it indicates that the UE is registered with the single radio controller, and the single radio controller generates a paging area list for the UE, and if it is determined that the location area hierarchical management context of the UE is not stored, it indicates that the UE is a newly accessed UE, or the location area hierarchical management context of the UE is deleted, the single radio controller sends the second request message to a first CC, so as to initiate an inter-single radio controller update (ISU), and register with the first CC that the UE is in the area controlled by the single radio controller, where the second request message carries the single radio controller identity and the subscriber identity of the UE. The first CC records the single radio controller identity and the subscriber identity of the UE in a context of the UE, where the context of the UE may be specifically used in security and session management and a single radio controller-level mobility management context. The first CC returns the second response message to the single radio controller. In a practical application process, the second response message may be specifically an ISU accept message. The single radio controller receives the second response message, establishes the location area hierarchical management context of the UE, generates the paging area list of the UE, and may record the paging area list in the location area hierarchical management context of the UE.

In this embodiment, the foregoing second request message may be an initial terminal message (Initial UE Message) or an uplink NAS transport message.

Specifically, if the ISU is initiated in an RRC connection setup process of the UE, the second request message may be specifically the initial terminal message, and the second response message may be an initial terminal complete message. If the ISU is initiated when the UE is in a connected state, the second request message may be specifically the uplink NAS transport message, and the second response message may be an initial context setup request or a downlink NAS transport message.

For example, a location update is initiated in the RRC connection setup process of the UE, and the UE sends an RRC connection setup complete message to the access network device, where the RRC connection setup complete message includes the subscriber identity of the UE, first location area information of a location area accessed by the UE last time, and hierarchical location update indication information, and the hierarchical location update indication information is used to indicate that the UE supports the single radio controller in performing a location update on the UE. The access network device adds the subscriber identity of the UE, the first location area information of the location area accessed by the UE last time, and the hierarchical location update indication information to the first request message, and sends the first request message to the single radio controller to request the single radio controller to perform a location update on the UE. After determining, according to the hierarchical location update indication information, that the UE supports the single radio controller in performing a location update on the UE, the single radio controller determines, according to the subscriber identity of the UE, whether the single radio controller stores the location area hierarchical management context of the UE; and if the single radio controller stores the location area hierarchical management context of the UE, generates the paging area list according to the location area in which the UE is currently located and the first location area information, or if the single radio controller does not store the location area hierarchical management context of the UE, sends the initial terminal message to the first CC, where the initial terminal message carries the single radio controller identity and the subscriber identity of the UE, and the initial terminal message indicates, to the first CC, that the UE supports location area hierarchical management. The single radio controller initiates an ISU, and registers with the first CC that the UE is in the area controlled by the single radio controller. The first CC sends an initial terminal complete message to the single radio controller, and after receiving the initial context setup request, the single radio controller establishes the location area hierarchical management context of the UE, and generates the paging area list according to the location area in which the UE is currently located and the first location area information. Finally, the single radio controller sends the first response message to the UE by using the access network device, and adds the paging area list of the UE to the first response message.

It should be noted that in a process of interaction between the UE and the first CC, if the first CC reallocates a temporary identity to the UE, or a key or an algorithm of air interface security changes, after performing an update for the UE, the first CC also sends, to the single radio controller, information about the foregoing change, so that the single radio controller updates corresponding information in the location area hierarchical management context of the UE.

In a process of gradual evolution of network deployment, in a wireless communication system, a situation may occur in which a single radio controller and a CC coexist with an MME and an SGSN that are in an existing network. In an area in which a single radio controller and a CC are not deployed, management may be performed on a location area of the UE according to a location area management method in the prior art. In an area in which a single radio controller and a CC are deployed, management may be performed on a location area of UE according to the method provided in this embodiment. Specifically, a broadcast message that carries an information element may be sent to notify the UE that a network side supports the single radio controller in performing a location update, and the broadcast message indicates that the UE that supports the single radio controller in performing a location update may add, when initiating a location update, hierarchical location update indication information to a message to be sent to the network side, where the hierarchical location update indication information is used to indicate that the UE supports the single radio controller in performing a location update on the UE, so that the single radio controller and the CC may determine, according to the indication information, whether to use the single radio controller to perform local area management on the UE. For example, the UE may directly add the hierarchical location update indication information to an NAS message, and send the NAS message to the CC. If the CC determines that the UE supports the single radio controller in performing a location update on the UE, the CC registers the UE according to a subscriber identity of the UE and a single radio controller identity that are sent by the single radio controller, and instructs the single radio controller to perform location area management on the UE. In this case, if the UE does not support the single radio controller in performing a location update on the UE, the CC may perform management on a location area of the UE.

According to the method provided in this embodiment, a single radio controller manages location areas of different network standards together, thereby implementing collaboration on an inter-standard location update, and simplifying mobility management of inter-standard movement of the UE. In addition, when the UE requests a location update from the single radio controller, the single radio controller determines, according to a subscriber identity of the UE, whether a hierarchical management context of the UE is stored. If the single radio controller stores a location area hierarchical management context of the UE, a paging area list of the UE is generated, that is, when having registered the UE with a CC, the single radio controller directly generates the paging area list of the UE, which reduces signaling of interaction between the single radio controller and the CC, and simplifies an operation procedure. If the single radio controller does not store the location area hierarchical management context of the UE, the single radio controller performs registration with the CC, and implements hierarchical management of location areas, and the CC implements inter-single radio controller mobility management. The single radio controller is responsible for managing location areas that are of different standards and that are within a coverage range. Therefore, a problem in the prior art that a core network device cannot perform a prompt update according to a change of a coverage range of a location area is resolved, and a single radio controller serving a UE can be quickly located in a paging process, thereby performing efficient paging.

Optionally, in a first implementation scenario in this embodiment, the first request message further carries an attach request message, a hierarchical location update request message, or a preset information element. The attach request message is used to request the first CC to register the UE, and may be specifically added by the UE to an RRC connection setup complete message or an uplink information transfer message, and sent to the single radio controller or the access network device. The preset information element may be hierarchical location update indication information, which is used to indicate that the UE supports the single radio controller in performing a location update on the UE.

For example, in a network attachment process of the UE, the RRC connection setup complete message sent by the UE to the access network device carries the subscriber identity of the UE, the hierarchical location update request message, and the attach request message to request a location update. The access network device adds the hierarchical location update request message, the attach request message, and the subscriber identity of the UE to the first request message, and sends the first request message to the single radio controller. After obtaining the hierarchical location update request message by means of parsing, the single radio controller determines, according to the subscriber identity of the UE, whether the location area hierarchical management context of the UE is stored; and if it is determined that the location area hierarchical management context of the UE is stored, directly generates the paging area list, and if it is determined that the location area hierarchical management context of the UE is not stored, sends an uplink NAS transport message to the first CC, where the uplink NAS transport message carries the single radio controller identity, the subscriber identity of the UE, and the attach request message, initiates an ISU, and registers with the first CC that the UE is in the area controlled by the single radio controller. The first CC sends an initial context setup request message or an attach accept message to the single radio controller, and the single radio controller establishes the location area hierarchical management context of the UE, and generates the paging area list of the UE. Finally, the single radio controller sends an RRC connection reconfiguration message to the UE by using the access network device, and adds the paging area list of the UE to the RRC connection reconfiguration message.

For another example, when the UE is in a connected state and initiates a location update, the uplink information transfer message sent by the UE to the access network device carries the subscriber identity of the UE, the attach request message, and the hierarchical location update indication information. The access network device adds the attach request message, the subscriber identity of the UE, and the hierarchical location update indication information to the first request message, and sends the first request message to the single radio controller. After determining, according to the hierarchical location update indication information, that the UE supports the single radio controller in performing a location update on the UE, the single radio controller determines, according to the subscriber identity of the UE, whether the single radio controller stores the location area hierarchical management context of the UE; and if it is determined that the single radio controller stores the location area hierarchical management context of the UE, generates the paging area list according to the first location area information, and if it is determined that the single radio controller does not store the location area hierarchical management context of the UE, sends an uplink NAS transport message to the first CC, where the uplink NAS transport message carries the single radio controller identity, the subscriber identity of the UE, and the attach request message, initiates an ISU, and registers with the first CC that the UE is in the area controlled by the single radio controller. The first CC returns a response message to the single radio controller, and the single radio controller establishes the location area hierarchical management context of the UE, and generates the paging area list of the UE. Finally, the single radio controller sends the first response message to the access network device, where the first response message carries the paging area list. After receiving the first response message, the access network device adds the paging area list to a downlink information transfer message or an RRC connection reconfiguration message, and sends the downlink information transfer message or the RRC connection reconfiguration message to the UE.

Apparently, the foregoing attach request message may also be carried in another message except the second request message, and sent to the first CC, which is not limited herein.

Figure 3:
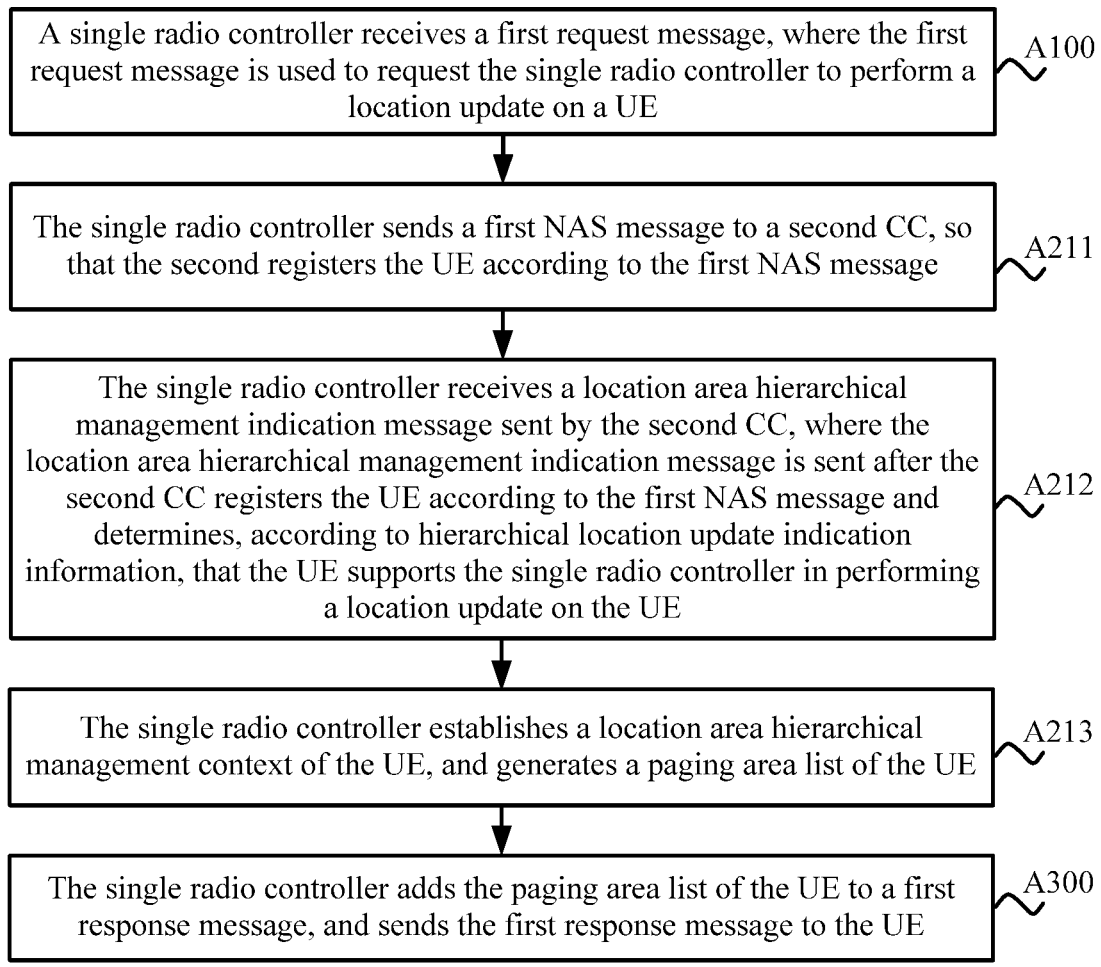
FIG. 3 is a flowchart of a third location area management method according to an embodiment.

FIG. 3 is a flowchart of a third location area management method according to an embodiment. As shown in FIG. 3, in this embodiment, the first request message further carries a first NAS message, the first NAS message carries hierarchical location update indication information, and the hierarchical location update indication information is used to indicate that the UE supports the single radio controller in performing a location update on the UE.

Accordingly, that the single radio controller generates a paging area list of the UE according to the first request message in step A200 includes the following steps.

Step A211: The single radio controller sends the first NAS message to a second CC, so that the second CC registers the UE according to the first NAS message.

The first NAS message carries the foregoing hierarchical location update indication information, and the first NAS message may be an attach request message or a hierarchical location update request message.

Specifically, the first NAS message may be carried in an initial terminal message or an uplink NAS transport message, and sent to the second CC. In addition, the initial terminal message or the uplink NAS transport message may carry the single radio controller identity of the single radio controller, and the single radio controller identity is used by the second CC to record, when the second CC registers the UE, the single radio controller serving the UE, so that when delivering a paging message, the second CC can quickly locate the single radio controller serving the UE.

The second CC and the third CC that is in the embodiment shown in FIG. 1 may be the same, or may be different, which is not limited herein.

Step A212: The single radio controller receives a location area hierarchical management indication message sent by the second CC, where the location area hierarchical management indication message is sent after the second CC registers the UE according to the first NAS message and determines, according to the hierarchical location update indication information, that the UE supports the single radio controller in performing a location update on the UE.

For example, after receiving the first NAS message, when determining, according to the hierarchical location update indication information, that the UE supports the single radio controller in performing a location update on the UE, the second CC may send the location area hierarchical management indication message to the single radio controller after registering the UE.

Step A213: The single radio controller establishes the location area hierarchical management context of the UE, and generates the paging area list of the UE.

Specifically, the UE that initiates a location update sends the first NAS message to the access network device, where the first NAS message carries the hierarchical location update indication information. The access network device then adds the first NAS message to the first request message, and sends the first request message to the single radio controller, and the single radio controller directly and transparently transmits the first NAS message to the second CC. After receiving the first NAS message, when determining, according to the hierarchical location update indication information in the first NAS message, that the UE supports the single radio controller in performing a location update on the UE, the second CC sends the location area hierarchical management indication message to the single radio controller after registering the UE. The single radio controller establishes the location area hierarchical management context of the UE, and generates the paging area list of the UE. For a specific process in which the single radio controller generates the paging area list of the UE, refer to related descriptions in step Embodiment 1.

According to the method provided in this embodiment, a single radio controller manages location areas of different network standards together, thereby implementing collaboration on an inter-standard location update. In addition, by means of collaboration between the single radio controller and a CC, the CC performs inter-single radio controller mobility management on the UE, and the single radio controller performs inter-location area mobility management on the UE, where the location areas are of different standards, thereby implementing hierarchical management of location areas, and resolving a problem in the prior art that a core network device cannot perform a prompt update according to a change of a coverage range of a location area.

Figure 4:
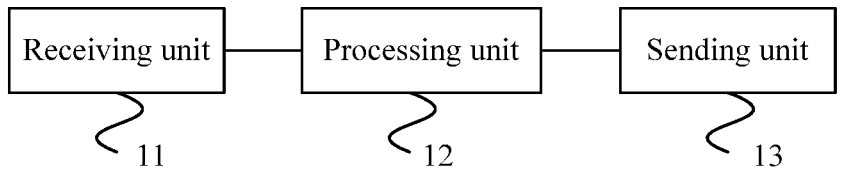
FIG. 4 is a schematic structural diagram of a first single radio controller according to an embodiment.

FIG. 4 is a schematic structural diagram of a first single radio controller according to an embodiment of the present invention. As shown in FIG. 4, the single radio controller provided in this embodiment may specifically implement the steps of the location area management method provided in any one of the embodiments shown in FIG. 1 to FIG. 3 in the present invention. A specific implementation process and related descriptions are not described herein again. The single radio controller provided in this embodiment specifically includes: a receiving unit 11, configured to receive a first request message, where the first request message is used to request the single radio controller to perform a location update on a UE; a processing unit 12, configured to generate a paging area list of the UE according to the first request message received by the receiving unit 11, where the paging area list includes a location area identity of a location area of at least one network standard; and a sending unit 13, configured to: add the paging area list of the UE generated by the processing unit 12 to a first response message, and send the first response message to the UE.

The foregoing location area identity of a location area of at least one network standard includes one or more of a tracking area identity, a routing area identity, and a cell identity.

The first request message may be an uplink information transfer message or an RRC connection setup complete message, and the first response message may be a downlink information transfer message or an RRC connection reconfiguration message.

The single radio controller provided in this embodiment receives a first request message, where the first request message is used to request the single radio controller to perform a location update on the UE; generates a paging area list of the UE according to the first request message, where the paging area list includes a location area identity of a location area of at least one network standard; and adds the paging area list of the UE to a first response message, and sends the first response message to the UE, thereby implementing an efficient dynamic paging area with the UE being a center, and improving a location area management effect. In addition, location areas of different network standards are managed together, collaboration on an inter-standard location update is implemented, and mobility management of inter-standard movement of the UE is simplified.

Optionally, the first request message carries a subscriber identity of the UE. The processing unit 12 may be further configured to: determine, according to the subscriber identity of the UE, whether a location area hierarchical management context of the UE is stored; and if it is determined that the location area hierarchical management context of the UE is stored, generate the paging area list of the UE, and/or if it is determined that the location area hierarchical management context of the UE is not stored, send a notification message to instruct the sending unit 13 to send a second request message to a first core network controller, where the second request message carries a single radio controller identity used to indicate the single radio controller and the subscriber identity of the UE, so that the first core network controller registers the UE according to the single radio controller identity and the subscriber identity of the UE.

The sending unit 13 is further configured to: when the processing unit 12 determines, according to the subscriber identity of the UE, that the location area hierarchical management context of the UE is not stored, receive the notification message sent by the processing unit 12, and send the second request message to the first core network controller.

The receiving unit 11 is further configured to: after the sending unit 13 sends the second request message, receive a second response message sent by the first core network controller, establish the location area hierarchical management context of the UE, and generate the paging area list of the UE.

Specifically, the first request message further carries identification information used to indicate the first core network controller, and the sending unit 13 sends the second request message to the first core network controller indicated by the identification information.

The second request message may be an initial terminal message or an uplink NAS transport message.

Optionally, the first response message further carries duration information of a location update timer. The processing unit 12 may be further configured to: start the location update timer, and if a message sent by the UE is still not received by the receiving unit 11 when the location update timer expires, delete the location area hierarchical management context of the UE, where duration of the location update timer is duration indicated by the duration information of the location update timer.

Optionally, the processing unit 12 is further configured to: when a UE context release request message or resource release request message of the UE is received by using the receiving unit 11, delete the location area hierarchical management context of the UE.

Specifically, the processing unit 12 is further configured to: acquire, according to the first request message, a location area in which the UE is currently located, and generate the paging area list of the UE according to the location area in which the UE is currently located and a preset topology mapping table and/or a preset network policy.

Optionally, the first request message carries first location area information used to indicate a location area accessed by the UE last time. The processing unit 12 may be further configured to: acquire a location area in which the UE is currently located, determine a movement track of the UE according to the location area in which the UE is currently located and the first location area information, and generate the paging area list of the UE according to the movement track of the UE, where the paging area list of the UE includes at least a location area identity of the location area in which the UE is currently located.

For details of determining of the movement track of the UE, refer to the embodiment shown in FIG. 1.

Optionally, the first request message further carries hierarchical location update indication information, the hierarchical location update indication information is used to indicate that the UE supports the single radio controller in performing a location update on the UE, and the processing unit 12 is further configured to: determine, according to the hierarchical location update indication information, whether the UE supports the single radio controller in performing a location update on the UE, and if it is determined that the UE supports the single radio controller in performing a location update on the UE, generate the paging area list of the UE according to the foregoing first request message.

Optionally, the first request message further carries a first NAS message, and the first NAS message carries hierarchical location update indication information.

The sending unit 13 may be further configured to send the first NAS message to a second core network controller, so that the second core network controller registers the UE according to the first NAS message.

The receiving unit 11 may be further configured to receive a location area hierarchical management indication message sent by the second core network controller, where the location area hierarchical management indication message is sent after the second core network controller registers the UE according to the first NAS message and determines, according to the hierarchical location update indication information, that the UE supports the single radio controller in performing a location update on the UE.

The processing unit 12 may be further configured to establish the location area hierarchical management context of the UE, and generate the paging area list of the UE.

Optionally, the first request message further carries an attach request message, and the attach request message is added by the UE to an RRC connection setup complete message, and sent to the single radio controller.

Optionally, the receiving unit 11 is further configured to receive a first paging message sent by a third core network controller, where the first paging message carries the subscriber identity of the UE.

The processing unit 12 may be further configured to acquire the paging area list of the UE according to the subscriber identity of the UE.

The sending unit 13 may be further configured to send a second paging message to a location area recorded in the paging area list of the UE, where the second paging message carries the subscriber identity of the UE.

FIG. 5 is a schematic structural diagram of a second single radio controller according to an embodiment. As shown in FIG. 5, the single radio controller provided in this embodiment may specifically implement the steps of the location area management method provided in any one of the embodiments shown in FIG. 1 to FIG. 3 in the present invention. A specific implementation process and related descriptions are not described herein again. The single radio controller provided in this embodiment specifically includes: a receiver 21, configured to receive a first request message, where the first request message is used to request the single radio controller to perform a location update on a UE; a processor 22, configured to generate a paging area list of the UE according to the first request message received by the receiver 21, where the paging area list includes a location area identity of a location area of at least one network standard; and a transmitter 23, configured to: add the paging area list of the UE generated by the processor 22 to a first response message, and send the first response message to the UE.

The foregoing location area identity of a location area of at least one network standard includes one or more of a tracking area identity, a routing area identity, and a cell identity.

The first request message may be an uplink information transfer message or an RRC connection setup complete message, and the first response message may be a downlink information transfer message or an RRC connection reconfiguration message.

The single radio controller provided in this embodiment receives a first request message, where the first request message is used to request the single radio controller to perform a location update on the UE; generates a paging area list of the UE according to the first request message, where the paging area list includes a location area identity of a location area of at least one network standard; and adds the paging area list of the UE to a first response message, and sends the first response message to the UE, thereby implementing an efficient dynamic paging area with the UE being a center, and improving a location area management effect. In addition, location areas of different network standards are managed together, collaboration on an inter-standard location update is implemented, and mobility management of inter-standard movement of the UE is simplified.

Optionally, the first request message carries a subscriber identity of the UE. The processor 22 may be further configured to: determine, according to the subscriber identity of the UE, whether a location area hierarchical management context of the UE is stored; and if it is determined that the location area hierarchical management context of the UE is stored, generate the paging area list of the UE, and/or if it is determined that the location area hierarchical management context of the UE is not stored, send a notification message to instruct the transmitter 23 to send a second request message to a first core network controller, where the second request message carries a single radio controller identity used to indicate the single radio controller and the subscriber identity of the UE, so that the first core network controller registers the UE according to the single radio controller identity and the subscriber identity of the UE.

The transmitter 23 is further configured to: when the processor 22 determines, according to the subscriber identity of the UE, that the location area hierarchical management context of the UE is not stored, receive the notification message sent by the processor 22, and send the second request message to the first core network controller.

The receiver 21 is further configured to: after the transmitter 23 sends the second request message, receive a second response message sent by the first core network controller, establish the location area hierarchical management context of the UE, and generate the paging area list of the UE.

Specifically, the first request message further carries identification information used to indicate the first core network controller, and the transmitter 23 sends the second request message to the first core network controller indicated by the identification information.

The second request message may be an initial terminal message or an uplink NAS transport message.

Optionally, the first response message further carries duration information of a location update timer. The processor 22 may be further configured to: start the location update timer, and if a message sent by the UE is still not received by the receiver 21 when the location update timer expires, delete the location area hierarchical management context of the UE, where duration of the location update timer is duration indicated by the duration information of the location update timer.

Optionally, the processor 22 is further configured to: when a UE context release request message or resource release request message of the UE is received by using the receiver 21, delete the location area hierarchical management context of the UE.

Specifically, the processor 22 is further configured to: acquire, according to the first request message, a location area in which the UE is currently located, and generate the paging area list of the UE according to the location area in which the UE is currently located and a preset topology mapping table and/or a preset network policy.

Optionally, the first request message carries first location area information used to indicate a location area accessed by the UE last time. The processor 22 may be further configured to: acquire a location area in which the UE is currently located, determine a movement track of the UE according to the location area in which the UE is currently located and the first location area information, and generate the paging area list of the UE according to the movement track of the UE, where the paging area list of the UE includes at least a location area identity of the location area in which the UE is currently located.

For details of determining of the movement track of the UE, refer to the embodiment shown in FIG. 1.

Optionally, the first request message further carries hierarchical location update indication information, the hierarchical location update indication information is used to indicate that the UE supports the single radio controller in performing a location update on the UE, and the processor 22 is further configured to: determine, according to the hierarchical location update indication information, whether the UE supports the single radio controller in performing a location update on the UE, and if it is determined that the UE supports the single radio controller in performing a location update on the UE, generate the paging area list of the UE according to the foregoing first request message.

Optionally, the first request message further carries a first NAS message, and the first NAS message carries hierarchical location update indication information.

The transmitter 23 may be further configured to send the first NAS message to a second core network controller, so that the second core network controller registers the UE according to the first NAS message.

The receiver 21 may be further configured to receive a location area hierarchical management indication message sent by the second core network controller, where the location area hierarchical management indication message is sent after the second core network controller registers the UE according to the first NAS message and determines, according to the hierarchical location update indication information, that the UE supports the single radio controller in performing a location update on the UE.

The processor 22 may be further configured to establish the location area hierarchical management context of the UE, and generate the paging area list of the UE.

Optionally, the first request message further carries an attach request message, and the attach request message is added by the UE to an RRC connection setup complete message, and sent to the single radio controller.

Optionally, the receiver 21 is further configured to receive a first paging message sent by a third core network controller, where the first paging message carries the subscriber identity of the UE.

The processor 22 may be further configured to acquire the paging area list of the UE according to the subscriber identity of the UE.

The transmitter 23 may be further configured to send a second paging message to a location area recorded in the paging area list of the UE, where the second paging message carries the subscriber identity of the UE.

FIG. 6 is a flowchart of a fourth location area management method according to an embodiment. As shown in FIG. 6, the location area management method provided in this embodiment may be specifically implemented in conjunction with the method that is applied to a single radio controller and that is provided in the embodiments shown in FIG. 1 to FIG. 3. A specific implementation process is not described herein again.

The location area management method provided in this embodiment specifically includes the following steps.

Step B100: A UE requests a single radio controller to perform a location update on the UE, so that the single radio controller receives a first request message, where the first request message is used to request the single radio controller to perform a location update on the UE, and after generating a paging area list of the UE according to the first request message, the single radio controller sends the paging area list of the UE to the UE, where the paging area list includes a location area identity of a location area of at least one network standard.

The foregoing location area identity of a location area of at least one network standard includes one or more of a tracking area identity, a routing area identity, and a cell identity.

Step B200: The UE receives the paging area list of the UE sent by the single radio controller, so that the UE performs location update determining according to the paging area list of the UE.

Specifically, the UE performs location update determining according to the paging area list, so that when the UE is in an idle state, and moves in location areas that are of different standards and that are in the paging area list, except a periodical location update, no other location update is performed, which reduces signaling load of a system.

Specifically, when the single radio controller and an access network device are independent of each other, the paging area list of the UE may be sent to the access network device by using a first response message, and then sent by the access network device to the UE by using an RRC message. When the single radio controller and the access network device are integrated, the single radio controller may directly send the first response message that carries the paging area list of the UE to the UE. Further, the first response message may further carry duration information of a location update timer, which is used to configure duration that is of the timer and that is for performing a periodical location update on the UE.

According to the location area management method provided in this embodiment, a UE requests a single radio controller to perform a location update on the UE, so that the single radio controller receives a first request message, where the first request message is used to request the single radio controller to perform a location update on the UE, and after generating a paging area list of the UE according to the first request message, the single radio controller sends the paging area list of the UE to the UE, where the paging area list includes a location area identity of a location area of at least one network standard. The UE receives the paging area list of the UE sent by the single radio controller, and the UE performs location update determining according to the paging area list, so that when the UE is in an idle state, and moves in location areas that are of different standards and that are in the paging area list, except a periodical location update, no other location update is performed, which reduces signaling load of a system.

In an implementation scenario in this embodiment, that a user equipment requests a single radio controller to perform a location update on the UE in step B100 may include that:

the UE sends a first NAS message to the access network device, so that the access network device adds the first NAS message to the first request message, and sends the first request message to the single radio controller; or the UE sends the first request message to the single radio controller, where the first request message includes a first NAS message.

The first NAS message carries hierarchical location update indication information, which is used to indicate that the UE supports the single radio controller in performing a location update on the UE.

The access network device may be a BSC, an RNC, or an eNB, which is not limited herein.

In another implementation scenario in this embodiment, that a user equipment requests a single radio controller to perform a location update on the UE in step B100 may include that: the UE sends a third request message to the access network device, so that the access network device sends the first request message to the single radio controller according to the third request message, where the third request message is used to request the single radio controller to perform a location update on the UE; or the UE sends the first request message to the single radio controller.

The first request message and the third request message carry hierarchical location update indication information, which is used to indicate that the UE supports the single radio controller in performing a location update on the UE.

FIG. 7 is a flowchart of a fifth location area management method according to an embodiment. As shown in FIG. 7, the location area management method provided in this embodiment may be specifically implemented in conjunction with the method that is applied to a single radio controller and that is provided in the embodiment shown in FIG. 2. A specific implementation process is not described herein again.

The location area management method provided in this embodiment specifically includes the following steps.

Step C100: A CC receives a second request message sent by a single radio controller, where the second request message carries a single radio controller identity used to indicate the single radio controller and a subscriber identity of a UE.

Step C200: The CC registers the UE according to the single radio controller identity and the subscriber identity of the UE.

Step C300: The CC sends a second response message to the single radio controller, so that, according to the second response message, the single radio controller establishes a location area hierarchical management context of the UE and generates a paging area list of the UE.

Optionally, in a scenario in which the method is implemented in conjunction with the method that is applied to a single radio controller and that is provided in the embodiment shown in FIG. 3, the foregoing second request message may include a first NAS message, and the first NAS message carries hierarchical location update indication information, which is used to indicate that the UE supports the single radio controller in performing a location update on the UE.

In step C200, after the CC registers the UE according to the single radio controller identity and the subscriber identity of the UE, the foregoing method further includes determining, by the CC according to the hierarchical location update indication information, whether the UE supports the single radio controller in performing a location update on the UE, and if it is determined that the UE supports the single radio controller in performing a location update on the UE, sending the second response message to the single radio controller, so that the single radio controller establishes the location area hierarchical management context of the UE, and generates the paging area list of the UE.

The second response message may be a location area hierarchical management indication message.

According to the location area management method provided in this embodiment, a core network controller receives a second request message sent by a single radio controller, where the second request message carries a single radio controller identity used to indicate the single radio controller and a subscriber identity of UE, the CC registers the UE according to the single radio controller identity and the subscriber identity of the UE, and the CC sends a second response message to the single radio controller, so that, according to the second response message, the single radio controller establishes a location area hierarchical management context of the UE and generates a paging area list of the UE, thereby implementing an efficient dynamic paging area with the UE being a center, and improving a location area management effect. By means of cooperation between the CC and the single radio controller, location areas of different network standards are managed together hierarchically, where the CC is responsible for registering the UE, and the single radio controller is responsible for managing an inter-standard location update, for the UE, inside the single radio controller; therefore, effective collaboration on an inter-standard location update is implemented. In addition, by determining whether the location area hierarchical management context of the UE is stored, the single radio controller determines whether the UE has completed registration with the CC, which can significantly reduce signaling exchange between the single radio controller and the CC, so that a delay is reduced.

Optionally, in an implementation scenario, the location area management method may further include: sending, by the CC, a first paging message to the single radio controller, where the first paging message carries the subscriber identity of the UE, so that the single radio controller acquires the paging area list of the UE according to the subscriber identity of the UE, and sends a second paging message to a location area recorded in the paging area list of the UE, where the second paging message carries the subscriber identity of the UE.

Figure 8:
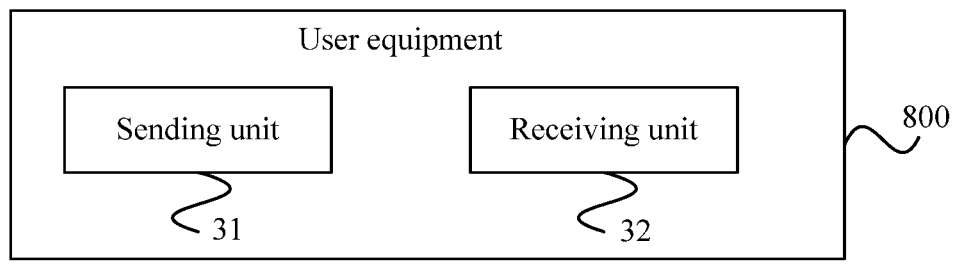
FIG. 8 is a schematic structural diagram of a first user equipment according to an embodiment.

FIG. 8 is a schematic structural diagram of a first user equipment according to an embodiment. As shown in FIG. 8, a user equipment 800 provided in this embodiment may specifically implement the steps of the location area management method that is applied to the user equipment and that is provided in any one of the embodiments of the present invention. A specific implementation process is not described herein again. The user equipment 800 specifically includes: a sending unit 31, configured to request a single radio controller to perform a location update on the user equipment 800, so that the single radio controller receives a first request message, where the first request message is used to request the single radio controller to perform a location update on the UE, and after generating a paging area list of the UE according to the first request message, the single radio controller sends the paging area list of the UE to the UE, where the paging area list includes a location area identity of a location area of at least one network standard; and a receiving unit 32, configured to receive the paging area list of the UE sent by the single radio controller, so that the UE performs location update determining according to the paging area list.

The foregoing location area identity of a location area of at least one network standard includes one or more of a tracking area identity, a routing area identity, and a cell identity.

Optionally, the sending unit 31 is further configured to send a first NAS message to an access network device, so that the access network device adds the first NAS message to the first request message, and sends the first request message to the single radio controller; or send the first request message to the single radio controller, where the first request message includes the first NAS message.

The first NAS message carries hierarchical location update indication information, which is used to indicate that the UE supports the single radio controller in performing a location update on the UE.

Optionally, the sending unit 31 is further configured to send a third request message to an access network device, so that the access network device sends the first request message to the single radio controller according to the third request message, where the third request message is used to request the single radio controller to perform a location update on the UE; or send the first request message to the single radio controller.

The first request message and the third request message carry the foregoing hierarchical location update indication information.

Optionally, the third request message may carry an attach request message, so that the UE registers with a CC by using the single radio controller.

The user equipment provided requests a single radio controller to perform a location update on the UE, so that the single radio controller receives a first request message, where the first request message is used to request the single radio controller to perform a location update on the user equipment UE, and after generating a paging area list of the UE according to the first request message, the single radio controller sends the paging area list of the UE to the UE, where the paging area list includes a location area identity of a location area of at least one network standard; and receives the paging area list of the UE sent by the single radio controller, and the UE performs location update determining according to the paging area list, so that when the UE is in an idle state, and moves in location areas that are of different standards and that are in the paging area list, except a periodical location update, no other location update is performed, which reduces signaling load of a system.

Figure 9:
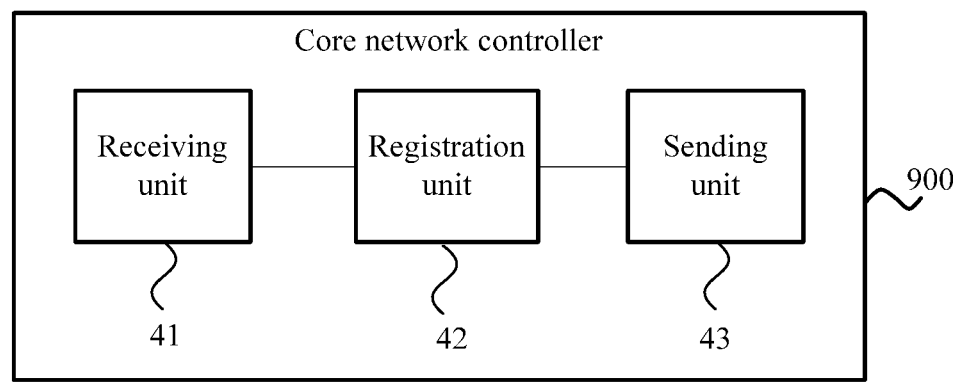
FIG. 9 is a schematic structural diagram of a first core network controller according to an embodiment.

FIG. 9 is a schematic structural diagram of a first core network controller according to an embodiment. As shown in FIG. 9, a core network controller 900 provided in this embodiment may specifically implement the steps of the location area management method that is applied to a core network controller and that is provided in any one of the embodiments of the present invention. A specific implementation process is not described herein again.

The core network controller 900 provided in this embodiment specifically includes: a receiving unit 41, configured to receive a second request message sent by a single radio controller, where the second request message carries a single radio controller identity used to indicate the single radio controller and a subscriber identity of a UE; a registration unit 42, configured to register the UE according to the single radio controller identity and the subscriber identity of the UE that are received by the receiving unit 41; and a sending unit 43, configured to: after the registration unit 42 completes registration of the UE, send a second response message to the single radio controller, so that, according to the second response message, the single radio controller establishes a location area hierarchical management context of the UE and generates a paging area list of the UE.

Optionally, the second request message includes a first NAS message, the first NAS message carries hierarchical location update indication information, and the hierarchical location update indication information is used to indicate that the UE supports the single radio controller in performing a location update on the UE.

The sending unit 43 is configured to: if it is determined, according to the hierarchical location update indication information, that the UE supports the single radio controller in performing a location update on the UE, send the second response message to the single radio controller, so that the single radio controller establishes the location area hierarchical management context of the UE, and generates the paging area list of the UE.

The second response message may be a location area hierarchical management indication message.

Optionally, the sending unit 43 is further configured to send a first paging message to the single radio controller, where the first paging message carries the subscriber identity of the UE, so that the single radio controller acquires the paging area list of the UE according to the subscriber identity of the UE, and sends a second paging message to a location area recorded in the paging area list of the UE, where the second paging message carries the subscriber identity of the UE.

The core network controller provided in this embodiment receives a second request message sent by a single radio controller, where the second request message carries a single radio controller identity used to indicate the single radio controller and a subscriber identity of the UE; registers the UE according to the single radio controller identity and the subscriber identity of the UE; and sends a second response message to the single radio controller, so that, according to the second response message, the single radio controller establishes a location area hierarchical management context of the UE and generates a paging area list of the UE, thereby implementing an efficient dynamic paging area with the UE being a center, and improving a location area management effect. By means of cooperation between the CC and the single radio controller, location areas of different network standards are managed together hierarchically, where the CC is responsible for registering the UE, and the single radio controller is responsible for managing an inter-standard location update, for the UE, inside the single radio controller; therefore, effective collaboration on an inter-standard location update is implemented. In addition, by determining whether the location area hierarchical management context of the UE is stored, the single radio controller determines whether the UE completes registration with the CC, which can significantly reduce signaling exchange between the single radio controller and the CC, so that a delay is reduced.

Figure 10:
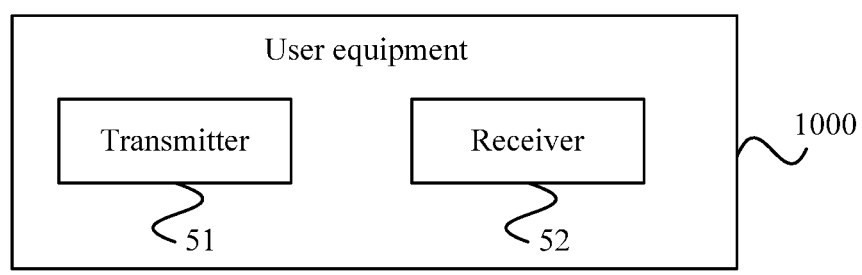
FIG. 10 is a schematic structural diagram of a second user equipment according to an embodiment.

FIG. 10 is a schematic structural diagram of a second user equipment according to an embodiment. As shown in FIG. 10, a user equipment 1000 provided in this embodiment may specifically implement the steps of the location area management method that is applied to the user equipment and that is provided in any one of the embodiments. A specific implementation process is not described herein again.

The user equipment 1000 provided in this embodiment specifically includes: a transmitter 51, configured to request a single radio controller to perform a location update on the UE, so that the single radio controller receives a first request message, where the first request message is used to request the single radio controller to perform a location update on the user equipment UE, and after generating a paging area list of the UE according to the first request message, the single radio controller sends the paging area list of the UE to the UE, where the paging area list includes a location area identity of a location area of at least one network standard; and a receiver 52, configured to receive the paging area list of the UE sent by the single radio controller, so that the UE performs location update determining according to the paging area list.

The foregoing location area identity of a location area of at least one network standard includes one or more of a tracking area identity, a routing area identity, and a cell identity.

Optionally, the transmitter 51 is further configured to: send a first NAS message to an access network device, so that the access network device adds the first NAS message to the first request message, and sends the first request message to the single radio controller; or send the first request message to the single radio controller, where the first request message includes the first NAS message.

The first NAS message carries hierarchical location update indication information, which is used to indicate that the UE supports the single radio controller in performing a location update on the UE.

Optionally, the transmitter 51 is further configured to: send a third request message to an access network device, so that the access network device sends the first request message to the single radio controller according to the third request message, where the third request message is used to request the single radio controller to perform a location update on the UE; or send the first request message to the single radio controller.

The first request message and the third request message carry the foregoing hierarchical location update indication information.

Optionally, the third request message may carry an attach request message, so that the UE registers with a CC by using the single radio controller.

The user equipment provided requests a single radio controller to perform a location update on the UE, so that the single radio controller receives a first request message, where the first request message is used to request the single radio controller to perform a location update on the user equipment UE, and after generating a paging area list of the UE according to the first request message, the single radio controller sends the paging area list of the UE to the UE, where the paging area list includes a location area identity of a location area of at least one network standard; and receives the paging area list of the UE sent by the single radio controller, and the UE performs location update determining according to the paging area list, so that when the UE is in an idle state, and moves in location areas that are of different standards and that are in the paging area list, except a periodical location update, no other location update is performed, which reduces signaling load of a system.

Figure 11:
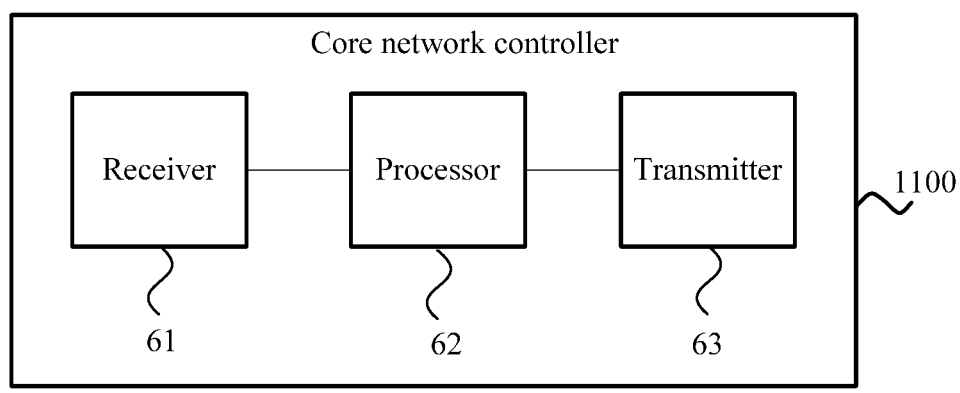
FIG. 11 is a schematic structural diagram of a second core network controller according to an embodiment.

FIG. 11 is a schematic structural diagram of a second core network controller according to an embodiment. As shown in FIG. 11, a core network controller 110000 provided in this embodiment may specifically implement the steps of the location area management method that is applied to a core network controller and that is provided in the embodiment shown in FIG. 2. A specific implementation process is not described herein again.

The core network controller 110000 provided in this embodiment specifically includes: a receiver 61, configured to receive a second request message sent by a single radio controller, where the second request message carries a single radio controller identity used to indicate the single radio controller and a subscriber identity of a UE; a processor 62, configured to register the UE according to the single radio controller identity and the subscriber identity of the UE that are received by the receiver 61; and a transmitter 63, configured to: after the processor 62 completes registration of the UE, send a second response message to the single radio controller, so that, according to the second response message, the single radio controller establishes a location area hierarchical management context of the UE and generates a paging area list of the UE.

Optionally, the transmitter 63 is further configured to send a first paging message to the single radio controller, where the first paging message carries the subscriber identity of the UE, so that the single radio controller determines the paging area list of the UE according to the subscriber identity of the UE, and sends a second paging message to a location area recorded in the paging area list of the UE, where the second paging message carries the subscriber identity of the UE.

Optionally, the second request message includes a first NAS message, the first NAS message carries hierarchical location update indication information, and the hierarchical location update indication information is used to indicate that the UE supports the single radio controller in performing a location update on the UE.

The transmitter 62 is configured to: if it is determined, according to the hierarchical location update indication information, that the UE supports the single radio controller in performing a location update on the UE, send the second response message to the single radio controller, so that the single radio controller establishes the location area hierarchical management context of the UE, and generates the paging area list of the UE.

The foregoing second response message may be a location area hierarchical management indication message.

The core network controller provided in this embodiment receives a second request message sent by a single radio controller, where the second request message carries a single radio controller identity used to indicate the single radio controller and a subscriber identity of the UE; registers the UE according to the single radio controller identity and the subscriber identity of the UE; and sends a second response message to the single radio controller, so that, according to the second response message, the single radio controller establishes a location area hierarchical management context of the UE and generates a paging area list of the UE, thereby implementing an efficient dynamic paging area with the UE being a center, and improving a location area management effect. By means of cooperation between the CC and the single radio controller, location areas of different network standards are managed together hierarchically, where the CC is responsible for registering the UE, and the single radio controller is responsible for managing an inter-standard location update, for the UE, inside the single radio controller; therefore, effective collaboration on an inter-standard location update is implemented. In addition, by determining whether the location area hierarchical management context of the UE is stored, the single radio controller determines whether the UE completes registration with the CC, which can significantly reduce signaling exchange between the single radio controller and the CC, so that a delay is reduced.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A location area management method, comprising:
receiving, by a radio controller that is disposed in an access network device and that is configured to manage a plurality of different network standards, a first request message, wherein the first request message requests that the radio controller to perform a location update on a user equipment (UE), wherein the first request message comprises a first non-access stratum (NAS) message, wherein the first NAS message comprises hierarchical location update indication information, and wherein the hierarchical location update indication information indicates that the UE supports the radio controller in performing a location update on the UE;
sending, by the radio controller, the first NAS message to a second core network controller;
receiving, by the radio controller, a location area hierarchical management indication message from the second core network controller in response to the first NAS message;
generating, by the radio controller, after the receiving, by the radio controller, the location area hierarchical management indication message, a paging area list of the UE according to the first request message, wherein the paging area list indicates at least two network standards of the plurality of different network standards and comprises a location area identity of a location area of each of the at least two network standards; and
sending, by the radio controller, the paging area list of the UE to the UE, wherein the sending the paging area list causes the UE to use the paging area list for location update determination without performing another location update initiated by the UE, other than a periodical location update, when the UE moves in location areas that are of different standards and that are in the paging area list.

2. The location area management method according to claim 1, wherein the location area identity of a location area of each of the at least two network standards comprises one or more of a tracking area identity (TAI), a routing area identity (RAI), or a cell identity.

3. The location area management method according to claim 1,
wherein the generating, by the radio controller, a paging area list of the UE according to the first request message comprises:
determining, by the radio controller according to the hierarchical location update indication information, whether the UE supports the radio controller in performing a location update on the UE; and
generating, by the radio controller in response to determining that the UE supports the radio controller in performing the location update on the UE, the paging area list of the UE according to the first request message.

4. The location area management method according to claim 1,
wherein the generating, by the radio controller, the paging area list of the UE according to the first request message comprises:
establishing, by the radio controller, a location area hierarchical management context of the UE; and
generating the paging area list of the UE after the establishing the location area hierarchical management context of the UE.

5. The location area management method according to claim 1, wherein the method further comprises:
starting, by the radio controller, a location update timer; and
deleting a location area hierarchical management context of the UE in response to a message sent by the UE is not received when the location update timer expires.

6. The location area management method according to claim 1, wherein the method further comprises:
sending, by the radio controller, duration information of a location update timer to the UE, wherein a duration of the location update timer is a duration indicated by the duration information of the location update timer.

7. The location area management method according to claim 1, wherein the method further comprises:
deleting, by the radio controller, a location area hierarchical management context of the UE in response to receiving at least one of a UE context release request message or a resource release request message of the UE.

8. The location area management method according to claim 1, wherein the generating the paging area list of the UE comprises:
acquiring, by the radio controller, a location area in which the UE is currently located; and
generating, by the radio controller, the paging area list of the UE according to the location area in which the UE is currently located and further according to at least one of a preset topology mapping table or a preset network policy.

9. The location area management method according to claim 1, wherein the first request message carries first location area information indicating a most recent location area accessed by the UE; and wherein the generating the paging area list of the UE comprises:
acquiring, by the radio controller, a location area in which the UE is currently located;
determining, by the radio controller, a movement track of the UE according to the location area in which the UE is currently located and the first location area information; and
generating, by the radio controller, the paging area list of the UE according to the movement track of the UE; and
wherein the paging area list of the UE comprises at least the location area identity of the location area in which the UE is currently located.

10. The location area management method according to claim 1, wherein the method further comprises:
receiving, by the radio controller, a first paging message from a third core network controller, wherein the first paging message carries a subscriber identity of the UE;
acquiring, by the radio controller, the paging area list of the UE according to the subscriber identity of the UE; and
sending, by the radio controller, a second paging message to a location area recorded in the paging area list of the UE, wherein the second paging message carries the subscriber identity of the UE.

11. A radio controller, wherein the radio controller is located in an access network device and comprises:
a receiver, configured to receive a first request message, wherein the first request message requests the radio controller to perform a location update on a user equipment (UE), wherein the first request message comprises a first non-access stratum (NAS) message, wherein the first NAS message comprises hierarchical location update indication information, and wherein the hierarchical location update indication information indicates that the UE supports the radio controller in performing a location update on the UE;
a processor coupled to the receiver;
a non-transitory computer-readable storage medium storing a program to be executed by the processor, the program including instructions to:
manage a plurality of different network standards;
send the first NAS message to a second core network controller;
receiving a location area hierarchical management indication message from the second core network controller in response to the first NAS message; and
generate a paging area list of the UE according to the first request message received by the receiver and after receiving the location area hierarchical management indication message, wherein the paging area list indicates at least two network standards of the plurality of different network standards and comprises a location area identity of a location area of each of the at least two network standards;
a transmitter coupled to the processor and configured to send the paging area list of the UE generated by the processor to the UE, wherein sending the paging area list causes the UE to use the paging area list for location update determination without performing another location update initiated by the UE, other than a periodical location update, when the UE moves in location areas that are of different standards and that are in the paging area list.

12. The radio controller according to claim 11, wherein the location area identity of a location area of each of the at least two network standards comprises one or more of a tracking area identity (TAI), a routing area identity (RAI), and a cell identity.

13. The radio controller according to claim 11,
    wherein the program further includes instructions to:
    determine, according to the hierarchical location update indication information, whether the UE supports the radio controller in performing a location update on the UE; and
    generate the paging area list of the UE according to the first request message in response to determining that the UE supports the radio controller in performing a location update on the UE.

14. The radio controller according to claim 11,
    wherein the program further includes instructions to establish a location area hierarchical management context of the UE and generate the paging area list of the UE.

15. The radio controller according to claim 11, wherein the program further includes instructions to:
    start a location update timer; and
    delete a location area hierarchical management context of the UE in response to a message sent by the UE not being received when the location update timer expires.

16. The radio controller according to claim 11, wherein the transmitter is further configured to:
    send duration information of a location update timer to the UE, wherein a duration of the location update timer is a duration indicated by the duration information of the location update timer.

17. The radio controller according to claim 11, wherein the program further includes instructions to:
    delete a location area hierarchical management context of the UE in response to receiving at least one of a UE context release request message or a resource release request message of the UE.

18. The radio controller according to claim 11, wherein the program further includes instructions to:
    acquire a location area in which the UE is currently located; and
    generate the paging area list of the UE according to the location area in which the UE is currently located and at least one of a preset topology mapping table or a preset network policy.

19. The radio controller according to claim 11, wherein the first request message carries first location area information indicating a most recent location area accessed by the UE; and
    wherein the program further includes instructions to:
    acquire a location area in which the UE is currently located;
    determine a movement track of the UE according to the location area in which the UE is currently located and the first location area information; and
    generate the paging area list of the UE according to the movement track of the UE, wherein the paging area list of the UE comprises at least the location area identity of the location area in which the UE is currently located.

20. The radio controller according to claim 11, wherein the receiver is further configured to receive a first paging message from a third core network controller, wherein the first paging message carries a subscriber identity of the UE;
    wherein the program further includes instructions to acquire the paging area list of the UE according to the subscriber identity of the UE; and
    wherein the transmitter is further configured to send a second paging message to a location area recorded in the paging area list of the UE, wherein the second paging message carries the subscriber identity of the UE.

* * * * *